(12) United States Patent
Martin et al.

(10) Patent No.: US 10,471,810 B2
(45) Date of Patent: Nov. 12, 2019

(54) VEHICLE DOOR LOCK DEVICE

(71) Applicants: MITSUI KINZOKU ACT CORPORATION, Kanagawa (JP); GECOM CORPORATION, Greensburg, IN (US)

(72) Inventors: Aaron Martin, Novi, MI (US); Brian Kepler, Novi, MI (US); Janani Viswanathan, Novi, MI (US); Bryan Farris, Novi, MI (US); Hiroki Hattori, Kanagawa (JP)

(73) Assignees: Mitsui Kinzoku Act Corporation, Kanagawa (JP); Gecom Corporation, Greensburg, IN (US)

(*) Notice: Subject to any disclaimer, the term of this patent is extended or adjusted under 35 U.S.C. 154(b) by 96 days.

(21) Appl. No.: 15/740,248

(22) PCT Filed: Apr. 5, 2016

(86) PCT No.: PCT/JP2016/061169
§ 371 (c)(1),
(2) Date: Dec. 27, 2017

(87) PCT Pub. No.: WO2017/006601
PCT Pub. Date: Jan. 12, 2017

(65) Prior Publication Data
US 2018/0186218 A1  Jul. 5, 2018

(30) Foreign Application Priority Data
Jul. 7, 2015 (JP) .................................. 2015-136063

(51) Int. Cl.
*E05B 77/34* (2014.01)
*B60J 5/04* (2006.01)
(Continued)

(52) U.S. Cl.
CPC ............. *B60J 5/0416* (2013.01); *E05B 77/34* (2013.01); *E05B 85/02* (2013.01); *E05B 79/22* (2013.01); *E05B 81/30* (2013.01); *E05B 83/36* (2013.01)

(58) Field of Classification Search
CPC ...... E05B 63/0056; E05B 77/34; E05B 79/04; E05B 79/12; E05B 85/02; E05B 85/06;
(Continued)

(56) References Cited

U.S. PATENT DOCUMENTS

| 6,546,767 B1 | 4/2003 | Kirejczyk et al. |
| 2013/0015673 A1* | 1/2013 | Akizuki .................. E05B 77/34 292/307 R |

(Continued)

FOREIGN PATENT DOCUMENTS

| CN | 201174459 Y | 12/2008 |
| DE | 199 55 693 A1 | 5/2001 |

(Continued)

OTHER PUBLICATIONS

Chinese Office Action issued in corresponding Chinese Patent Application No. 2016800374990.0, dated Dec. 4, 2018, with English Translation.

(Continued)

*Primary Examiner* — Suzanne L Barrett
(74) *Attorney, Agent, or Firm* — McDermott Will & Emery LLP

(57) ABSTRACT

A vehicle door lock device includes a lock/unlock unit including a lock/unlock mechanism switching whether to transmit a door opening operation to a latch mechanism; and a transmission unit transmitting a lock/unlock operation to the lock/unlock unit. Further, the lock/unlock unit includes a main case housing the lock/unlock mechanism and supporting the latch mechanism, an input member having a
(Continued)

rotation shaft passing through the main case, being coupled to the lock/unlock mechanism in the main case, and having an external coupling part outside the main case; and a cover closing an opening of the main case, the transmission unit includes a coupling member coupling a turned member to the external coupling part, and a sub case housing the coupling member, and the external coupling part protrudes from the main case in a vehicle outside direction in a state where the main case is attached to the door.

5 Claims, 19 Drawing Sheets

(51) Int. Cl.
    *E05B 85/02*     (2014.01)
    *E05B 79/22*     (2014.01)
    *E05B 81/30*     (2014.01)
    *E05B 83/36*     (2014.01)

(58) Field of Classification Search
    CPC .......... E05B 79/22; E05B 81/30; E05B 83/36; B60J 5/0416
    USPC .................................................. 70/237, 417
    See application file for complete search history.

(56) References Cited

U.S. PATENT DOCUMENTS

| | | | | |
|---|---|---|---|---|
| 2017/0335605 | A1* | 11/2017 | Kimura | ................... E05B 81/66 |
| 2017/0370130 | A1* | 12/2017 | Kimura | ................... E05B 77/34 |
| 2019/0003213 | A1* | 1/2019 | Yokomori | ................. B60J 5/00 |

FOREIGN PATENT DOCUMENTS

| | | |
|---|---|---|
| EP | 2 458 118 A1 | 5/2012 |
| JP | 2008-101393 A | 5/2008 |
| JP | 4496273 B2 | 7/2010 |
| JP | 2011-026779 A | 2/2011 |
| JP | 6030908 B2 | 9/2012 |
| JP | 6480100 B2 | 4/2014 |
| WO | 2009/059904 A1 | 5/2009 |

OTHER PUBLICATIONS

Extended European Search Report issued in corresponding European Patent Application No. 16821072.2-1005, dated Dec. 13, 2018.
International Search Report issued in corresponding International Patent Application PCT/JP2016/061169, dated Jun. 28, 2016.

* cited by examiner

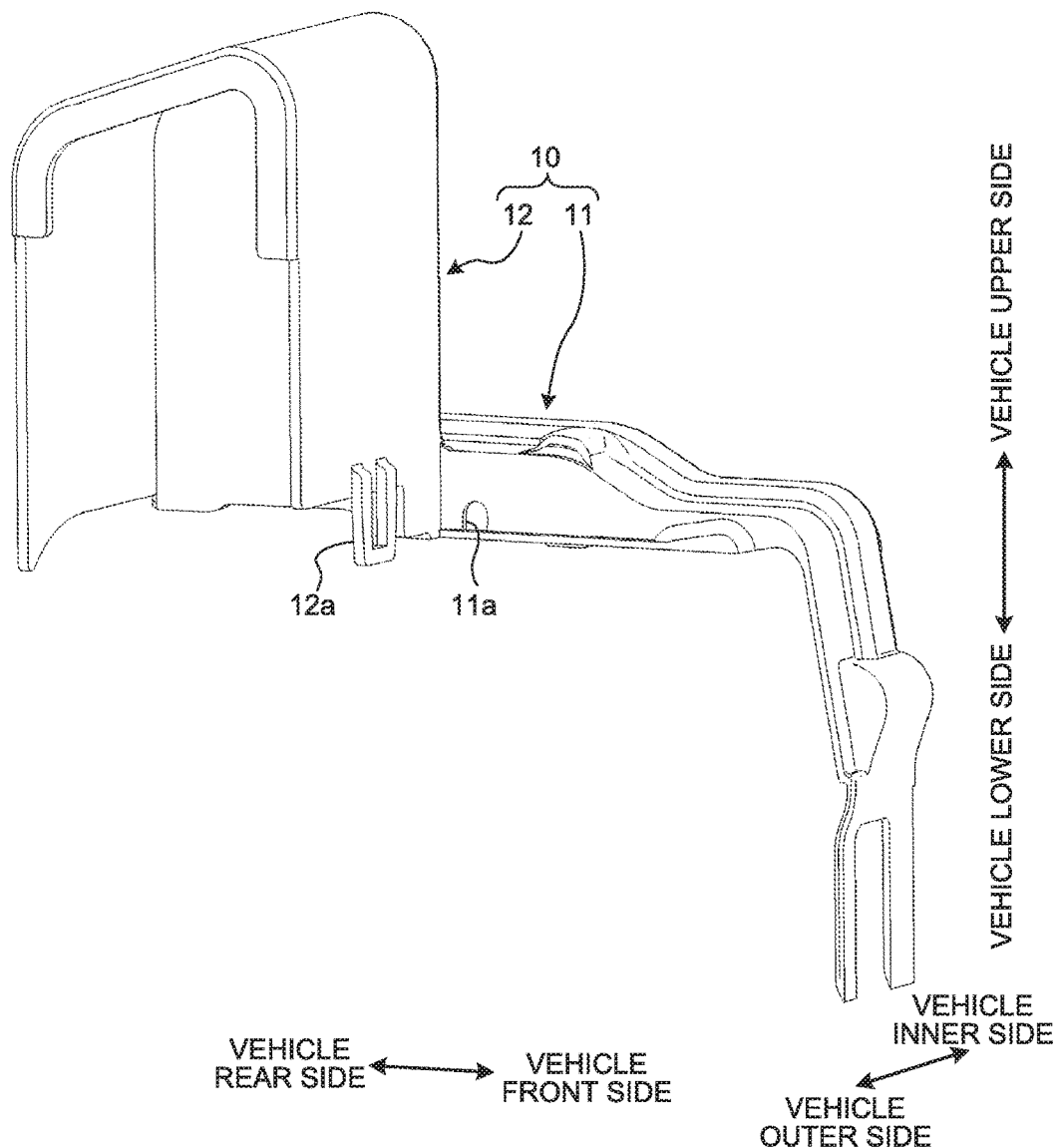

VEHICLE DOOR LOCK DEVICE

CROSS REFERENCE TO RELATED APPLICATIONS

This application is the U.S. National Phase under 35 U.S.C. § 371 of International Application No. PCT/JP2016/061169, filed on Apr. 5, 2016, which claims the benefit of Japanese Application No. 2015-136063, filed on Jul. 7, 2015, the entire contents of each are hereby incorporated by reference.

FIELD

The present invention relates to a vehicle door lock device.

BACKGROUND

Conventionally, there is a vehicle door lock device that transmits a rotational operation of a key cylinder to a lock/unlock mechanism with a coupling member. As an example of the vehicle door lock device, Patent Literature 1 discloses a technique of a vehicle-door opening/closing device that includes a turning-force transmission unit having a driven-side turning member that is detachably coupled to a key-operation-force input member to be incapable of relatively turning, a driving-side turning member that is detachably coupled to the other end part of a turning rod to be incapable of relatively turning, and a transmission member that transmits a turning force from the driving-side turning member to the driven-side turning member, which members are housed in an extension case. In the vehicle-door opening/closing device described in Patent Literature 1, the extension case is detachably attached to a casing of a door lock device so as to protrude from the casing.

CITATION LIST

Patent Literature

Patent Literature 1: Japanese Patent No. 5030908

SUMMARY

Technical Problem

Different forms of a coupling member that transmits a lock/unlock operation with a key to a lock/unlock mechanism are used according to grades of vehicles or options. If a configuration on the lock/unlock mechanism side of a coupling part of the coupling member can be commonalized, the number of dedicated components may be reduced.

An object of the present invention is to provide a vehicle door lock device capable of reducing the number of dedicated components.

Solution to Problem

A vehicle door lock device according to the present invention includes a lock/unlock unit including a lock/unlock mechanism that switches whether to transmit a door opening operation on a door to a latch mechanism and a transmission unit that transmits a lock/unlock operation with a key to the lock/unlock unit, in which the lock/unlock unit includes a main case that houses therein the lock/unlock mechanism and supports the latch mechanism, an input member having a rotation shaft passing through the main case, being coupled to the lock/unlock mechanism in the main case, and having an external coupling part outside the main case, and a cover that closes an opening of the main case, the transmission unit includes a coupling member that couples a turned member with the external coupling part, the turned member rotating integrally with a rotor of a key cylinder, and a sub case that houses therein the coupling member, and the external coupling part protrudes from the main case in a vehicle outside direction in a state where the main case is attached to the door.

Preferably, the vehicle door lock device includes a water immersion prevention body that integrally covers the main case and the cover from a vehicle upper side, and prevents water immersion into the main case.

Preferably, in the vehicle door lock device, the water immersion prevention body further covers the sub case and prevents water immersion into the sub case.

Preferably, in the vehicle door lock device, the sub case has an adjustment unit that is capable of adjusting a relative position in a vehicle upper/lower direction with respect to the main case.

Preferably, in the vehicle door lock device, the water immersion prevention body has a first water immersion prevention body that integrally covers the main case and the cover from a vehicle upper side, and a second water immersion prevention body that covers the sub case, and the sub case and the second water immersion prevention body have an adjustment unit that is capable of adjusting a relative position in a vehicle upper/lower direction with respect to the main case.

Preferably, in the vehicle door lock device, the sub case is fixed to the main case with an undetachable fixing unit.

Advantageous Effects of Invention

The vehicle door lock device according to the present invention includes a lock/unlock unit including a lock/unlock mechanism, and a transmission unit that transmits a lock/unlock operation with a key to the lock/unlock unit. An input member of the lock/unlock unit has a rotation shaft passing through a main case, is coupled to the lock/unlock mechanism in the main case, and has an external coupling part outside the main case. The external coupling part protrudes from the main case in a vehicle outside direction in a state where the main case is attached to a door. According to the vehicle door lock device of the present invention, an effect is obtained where plural forms of a coupling member are applicable to the external coupling part and the number of dedicated components may be reduced.

BRIEF DESCRIPTION OF DRAWINGS

FIG. 19 is a front view of the vehicle door lock device according to the modified embodiment.

DESCRIPTION OF EMBODIMENTS

A vehicle door lock device according to an embodiment of the present invention will be described below in detail with reference to the accompanying drawings. The present invention is not limited to the embodiment. Constituent elements in the following embodiment include those that can easily be achieved by a person skilled in the art, or that are substantially equivalent thereto.

Embodiment

Figure 1:
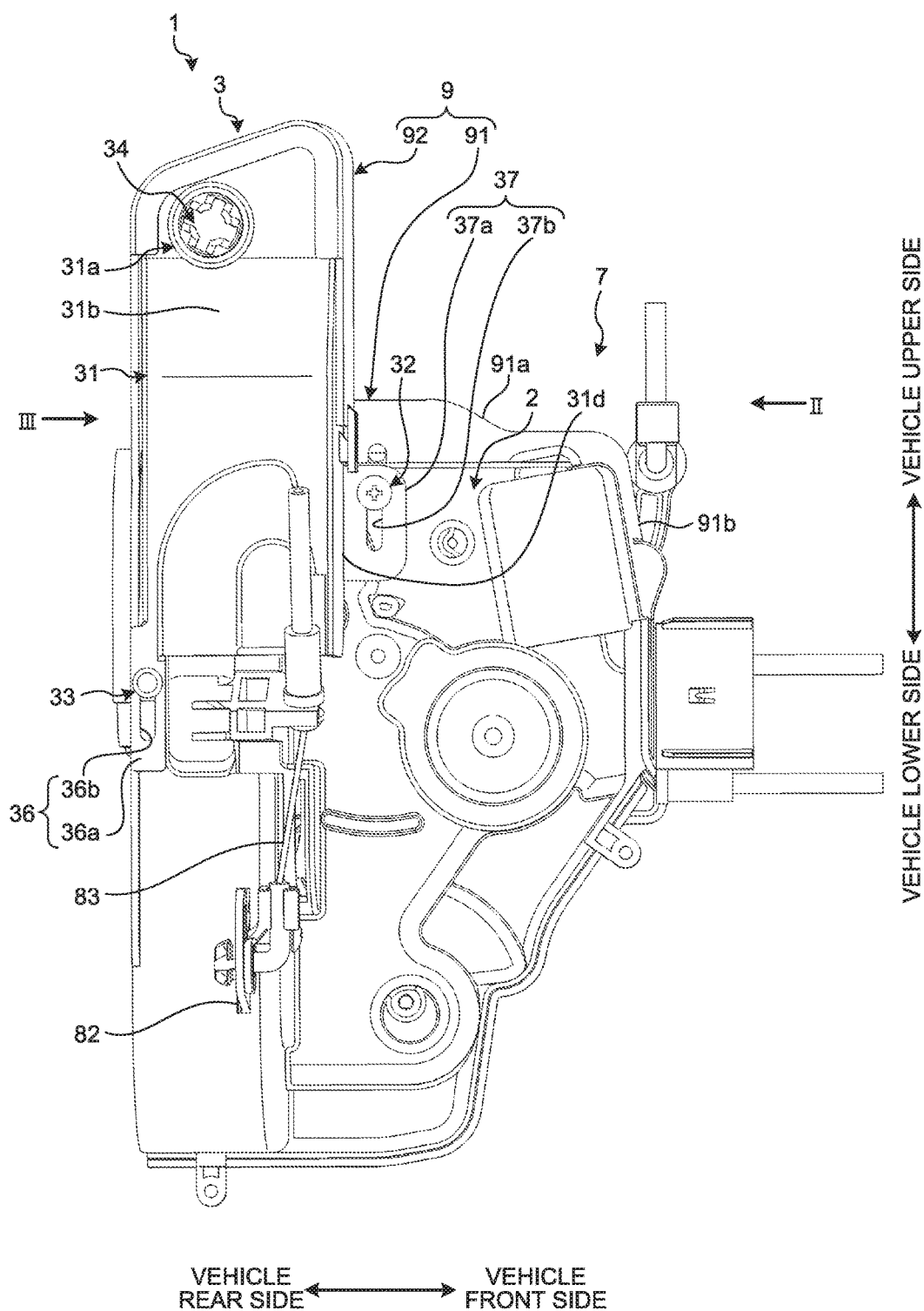
FIG. 1 is a front view of a vehicle door lock device according to an embodiment.
Figure 2:
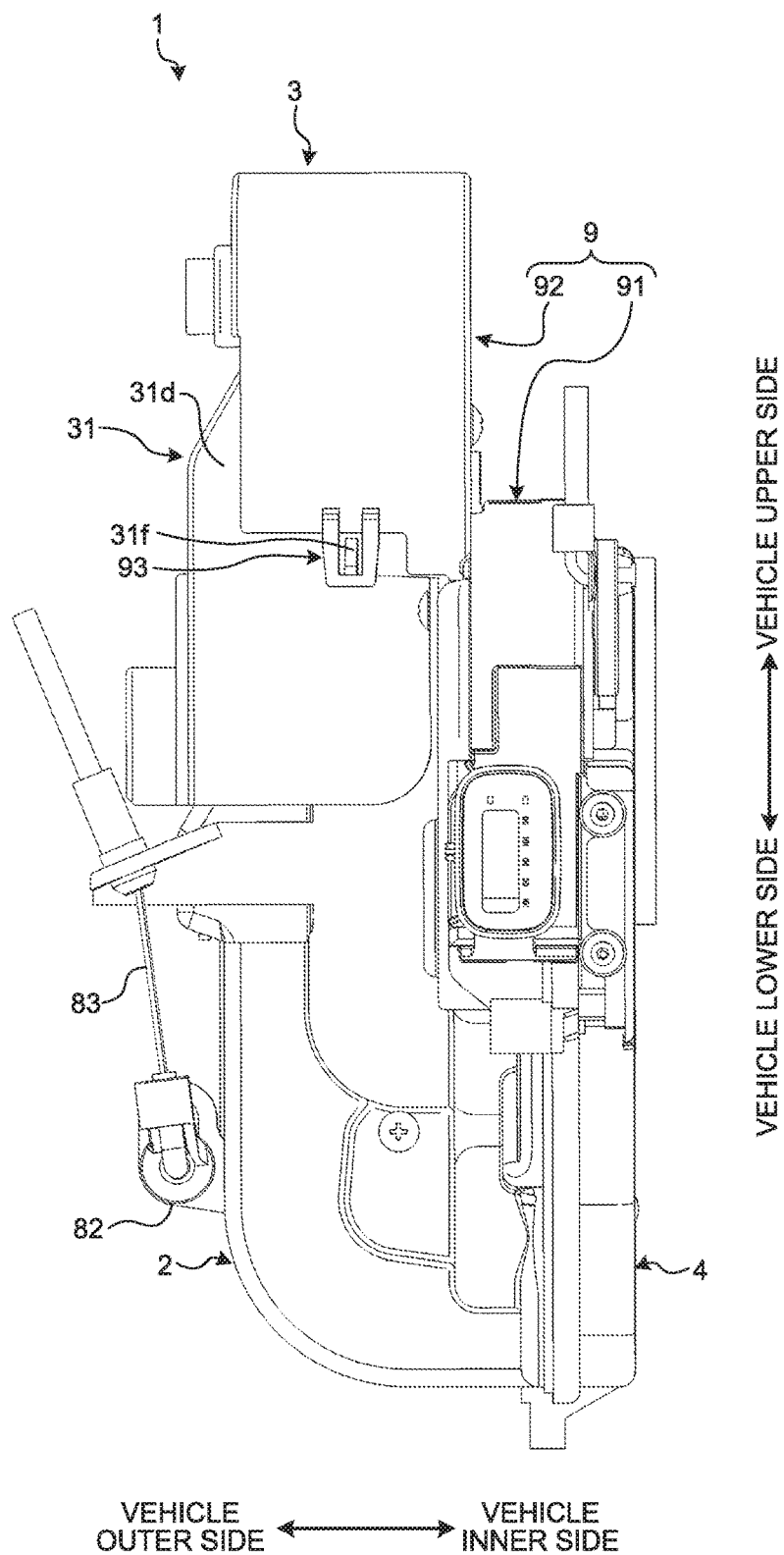
FIG. 2 is a vehicle front-side side view of the vehicle door lock device according to the embodiment.
Figure 3:
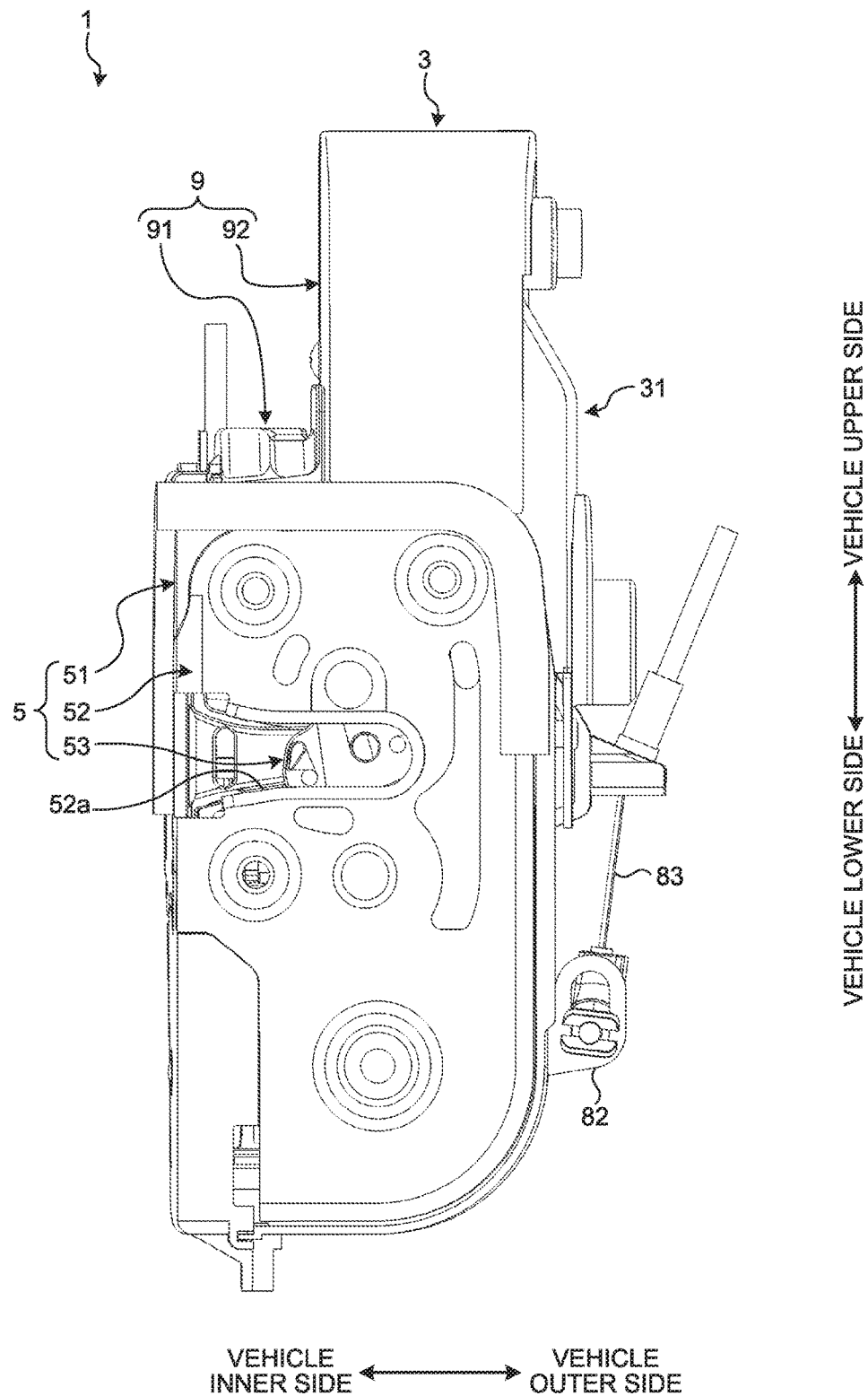
FIG. 3 is a vehicle rear-side side view of the vehicle door lock device according to the embodiment.

An embodiment is described with reference to FIGS. 1 to 17. The present embodiment relates to a vehicle door lock device. FIG. 1 is a front view of a vehicle door lock device according to the embodiment, FIG. 2 is a front-side side view of the vehicle door lock device according to the embodiment, and FIG. 3 is a rear-side side view of the vehicle door lock device according to the embodiment. FIG. 2 is a side view seen in a II direction in FIG. 1 and FIG. 3 is a side view seen in a III direction in FIG. 1. Directions shown in respective drawings are directions in a state where a vehicle door lock device 1 is attached to a vehicle door.

The vehicle door lock device 1 is applied to a vehicle door, for example, a door that opens and closes an opening formed on a side face of a vehicle body. As illustrated in FIG. 1, the vehicle door lock device 1 according to the embodiment has a lock/unlock unit 7 and a transmission unit 3. The lock/unlock unit 7 has a main case 2, a cover 4 illustrated, for example, in FIG. 2, a latch device 5 illustrated, for example, in FIG. 3, an input member 6 illustrated, for example, in FIG. 5, and a lock/unlock mechanism 70 illustrated, for example, in FIG. 8.

Figure 4:
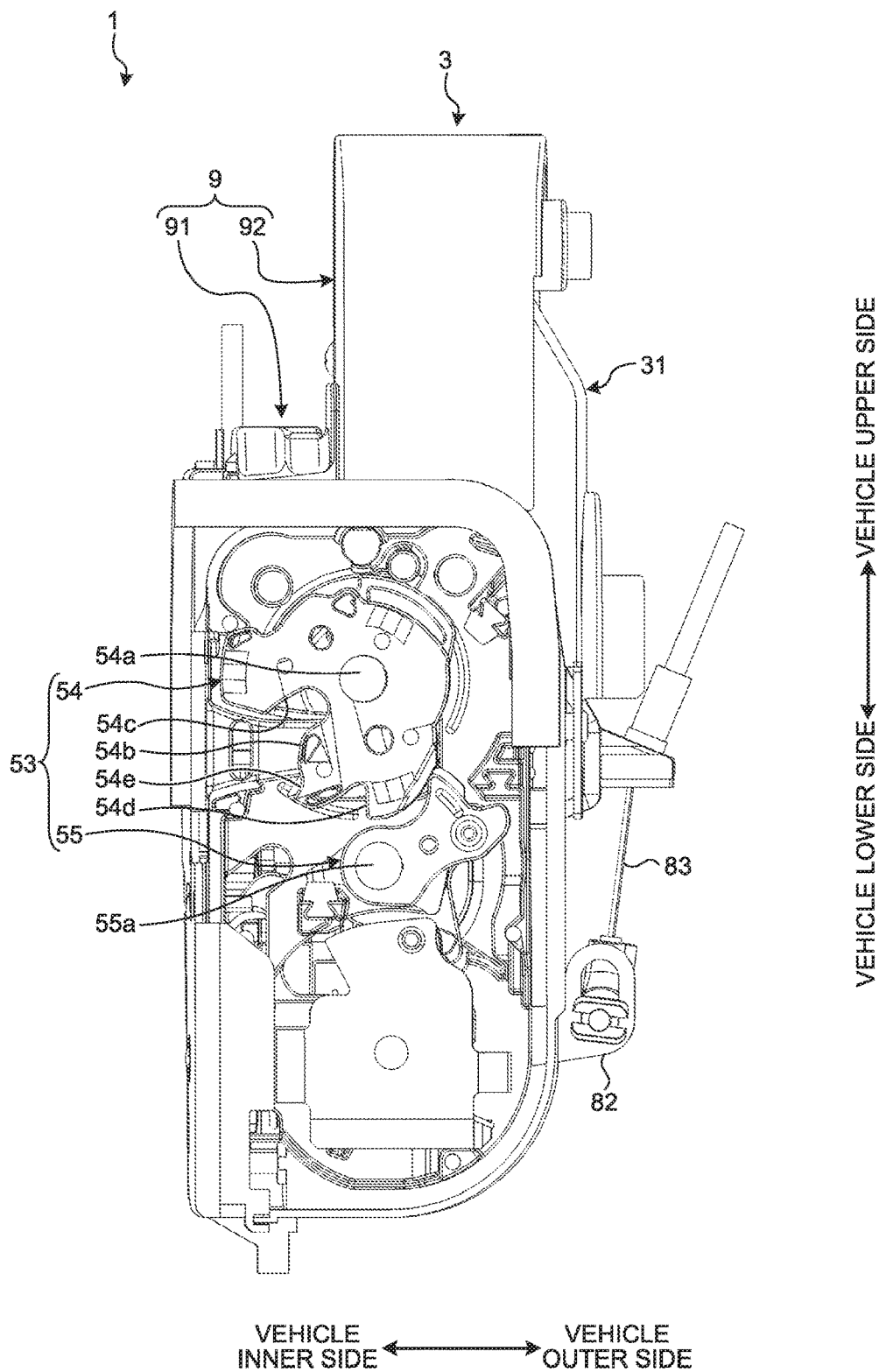
FIG. 4 is a drawing illustrating a latch mechanism according to the embodiment.

The main case 2 is a case that houses therein the lock/unlock mechanism 70 described later and supports a latch mechanism 53. The lock/unlock mechanism 70 switches whether to transmit a door opening operation on a door to the latch mechanism 53 which will be described with reference to FIG. 3. The cover 4 closes the opening of the main case 2 and forms a housing unit that houses therein the lock/unlock mechanism 70 along with the main case 2. As illustrated in FIG. 3, the latch device 5 is placed on a vehicle rear side of the main case 2. The latch device 5 has a body 51, a cover plate 52, and the latch mechanism 53. The cover plate 52 has an entrance groove 52a. A striker provided on the body of the vehicle enters the entrance groove 52a. As illustrated in FIG. 4, the latch mechanism 53 has a latch 54 and a ratchet 55. The latch 54 and the ratchet 55 are rotatably supported by shafts 54a and 55a, respectively. The latch 54 is biased by a spring in a clockwise direction (a releasing direction) in FIG. 4. The ratchet 55 is biased by a spring in a counterclockwise direction in FIG. 4.

FIG. 4 illustrates an unlatched state of the latch mechanism 53. When the door is to be closed and the striker enters the entrance groove 52a illustrated in FIG. 3, the striker abuts on an abutment part 54b of the latch 54 to rotate the latch 54 in a counterclockwise direction (an engaging direction). This causes an engagement groove 54c of the latch 54 to engage with the striker and hold the striker. The ratchet 55 abuts on the latch 54 in a state engaged with the striker and restricts rotation of the latch 54 in the releasing direction. The ratchet 55 stops the latch 54 at a half-latched position upon abutment on a first protruding part 54d of the latch 54, and stops the latch 54 at a full-latched position upon abutment on a second protruding part 54e.

The transmission unit 3 transmits a lock/unlock operation of a user with a key to the lock/unlock unit 7. The transmission unit 3 has a sub case 31, and a member 34 to be turned (hereinafter, "turned member 34") illustrated in FIG. 1. The sub case 31 is fixed to the main case 2 with a screw 32 and a thermal caulking part 33 formed by thermal caulking. The thermal caulking part 33 is, for example, a retention unit that is formed by inserting a protrusion that protrudes from the surface of the main case 2 into an adjustment hole 36b and then heating and deforming the protrusion. The sub case 31 is undetachably fixed to the main case 2 by thermal caulking. The turned member 34 is a member to be coupled to a rotor of a key cylinder of the vehicle door. A coupling member to the rotor of the key cylinder is inserted into the turned member 34 to enable the turned member 34 to rotate integrally with the rotor of the key cylinder. The sub case 31 has a support part 31a that rotatably supports the turned member 34. The support part 31a is a tubular part that is circular in cross-section and protrudes from an outer wall part 31b facing a vehicle outer side in the sub case 31. The turned member 34 is rotatably supported by an inner circumferential surface of the support part 31a.

Figure 6:
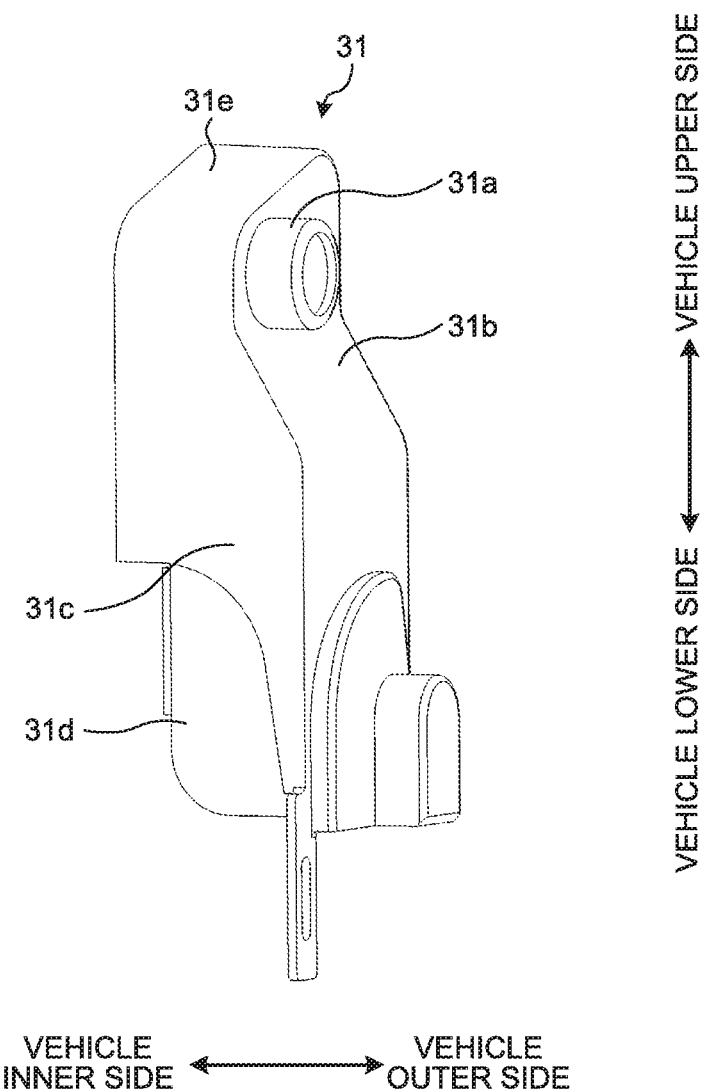
FIG. 6 is a perspective view of a sub case according to the embodiment.

The sub case 31 has side wall parts 31c and 31d and an upper wall part 31e, in addition to the outer wall part 31b as illustrated in FIG. 6. The side wall parts 31c and 31d are wall parts facing each other in a vehicle front/rear direction and are integrally molded with both end parts of the outer wall part 31b, respectively. The upper wall part 31e is a wall part in a vehicle upper direction and is integrally molded with an upper end part of the outer wall part 31b and the side wall parts 31c and 31d.

Figure 5:
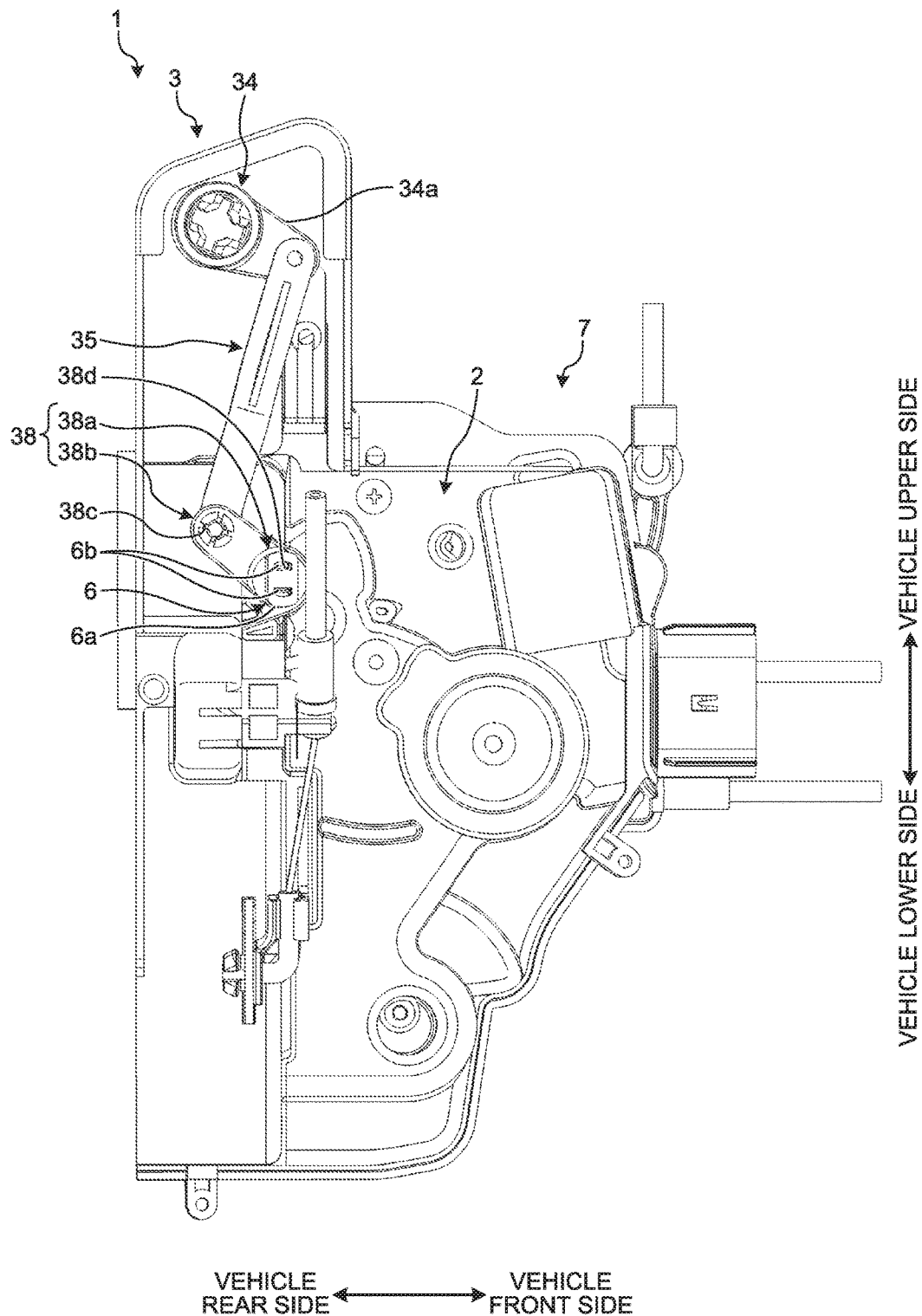
FIG. 5 is a front view illustrating an inside of a transmission unit according to the embodiment.
Figure 7:
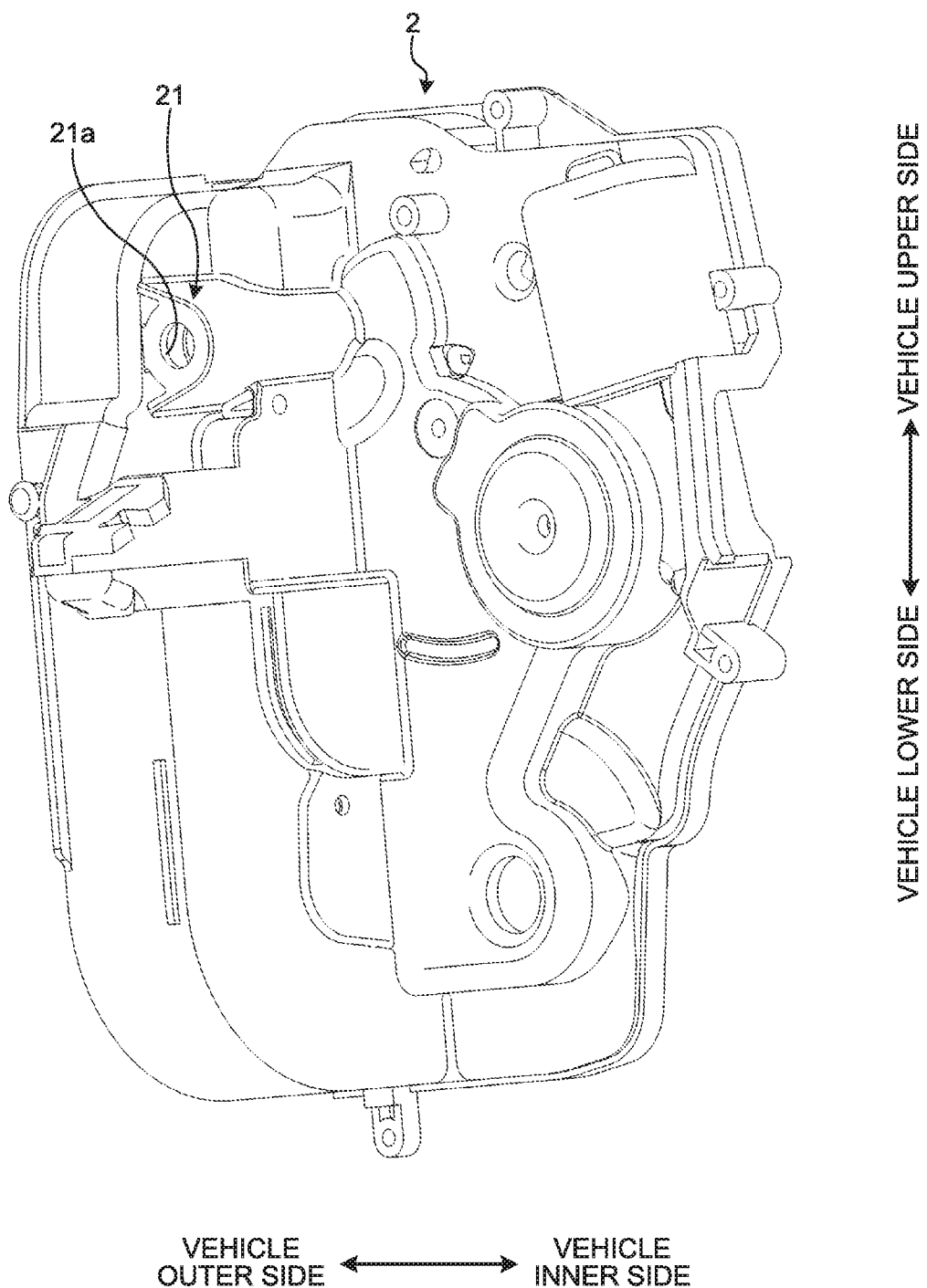
FIG. 7 is a perspective view of a main case according to the embodiment.

The transmission unit 3 has a first coupling member 35 and a second coupling member 38 illustrated in FIG. 5. The first coupling member 35 and the second coupling member 38 couple the turned member 34 to an external coupling part 6b of the input member 6. The first coupling member 35 is a plate-like member and is coupled to the turned member 34. The second coupling member 38 is coupled to the external coupling part 6b to be incapable of relatively rotating and couples the first coupling member 35 to the input member 6. The first coupling member 35 and the second coupling member 38 transmit a rotational operation of the rotor of the key cylinder from the turned member 34 to the input member 6. The input member 6 has a rotation shaft 6a passing through the main case 2 and is coupled to the lock/unlock mechanism 70 in the main case 2 as will be described later. As illustrated in FIG. 7, the main case 2 has a support part 21 that supports the input member 6. The support part 21 is provided on a wall part of the main case 2 on the vehicle outer side and is placed on an upper part of the main case 2 in a vehicle upper/lower direction. The support part 21 has a cylindrical shape and has a through hole 21a. The through hole 21a passes through the main case 2 in a vehicle internal/external direction and causes an internal space of the main case 2 and a space on a vehicle outer side of the main case 2 to be communicated with each other. The rotation shaft 6a of the input member 6 is inserted into the through hole 21a and is rotatably supported by the support part 21.

Referring back to FIG. 5, the second coupling member 38 has a cylindrical main body 38a and a coupling part 38b. Engagement holes 38d are provided on the main body 38a. The engagement holes 38d pass through the main body 38a in the central axis line direction. The external coupling part 6b of the input member 6 is engaged with the engagement holes 38d. The coupling part 38b is a plate-like part protruding from the main body 38a in a direction orthogonal to the central axis line of the main body 38a. A coupling hole 38c is provided on the coupling part 38b. One end of the first coupling member 35 is coupled to the coupling part 38b at the coupling hole 38c to be capable of relatively rotating. The turned member 34 has a coupling part 34a. The coupling part 34a is a plate-like part protruding from an external circumferential surface of the turned member 34 in a direction orthogonal to the central axis line of the turned member 34. The other end of the first coupling member 35 is coupled to the coupling part 34a at a coupling hole provided at a distal end of the coupling part 34a to be capable of relatively rotating.

Figure 8:
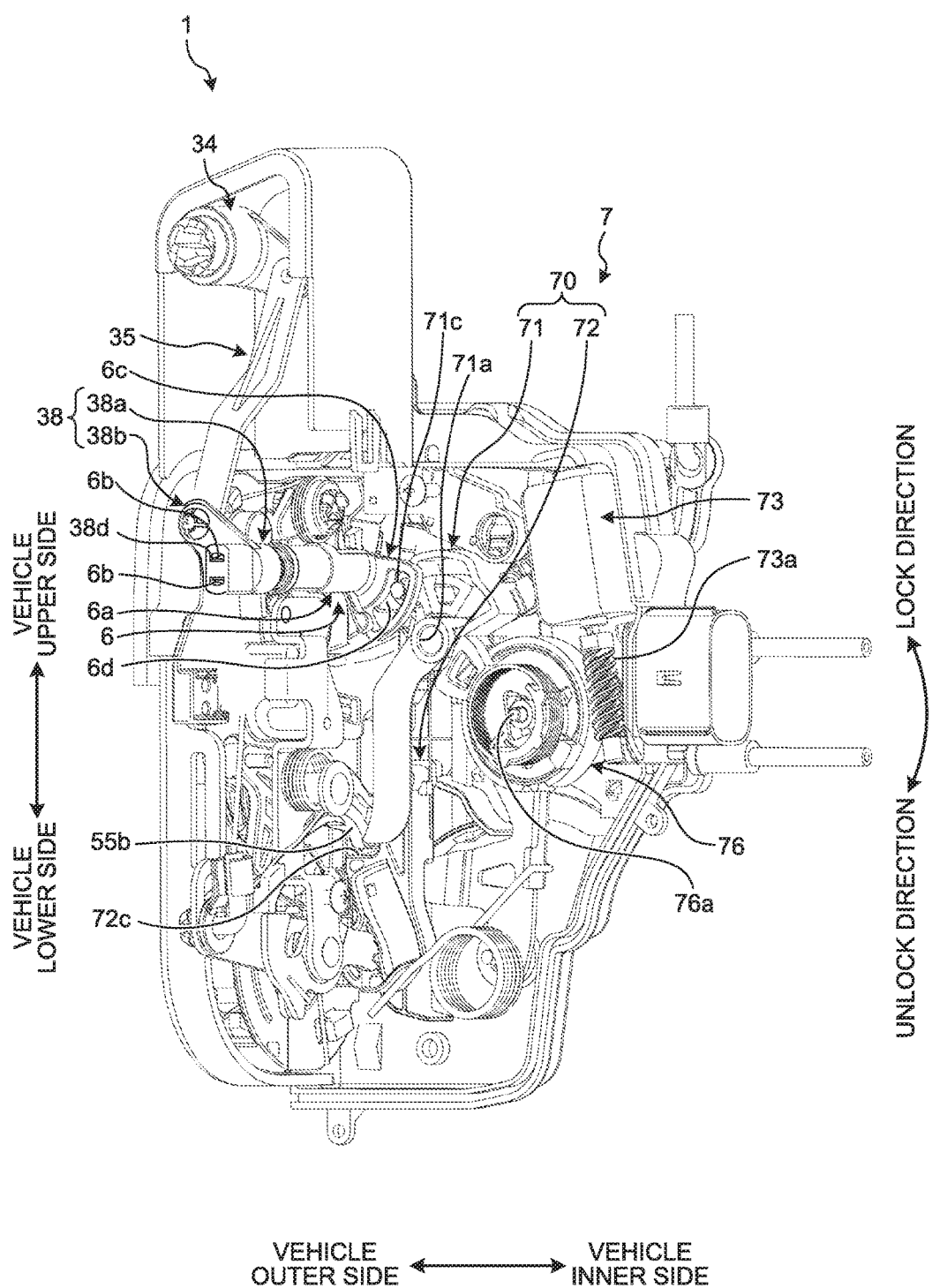
FIG. 8 is a perspective view illustrating an inside of a lock/unlock unit according to the embodiment.
Figure 9:
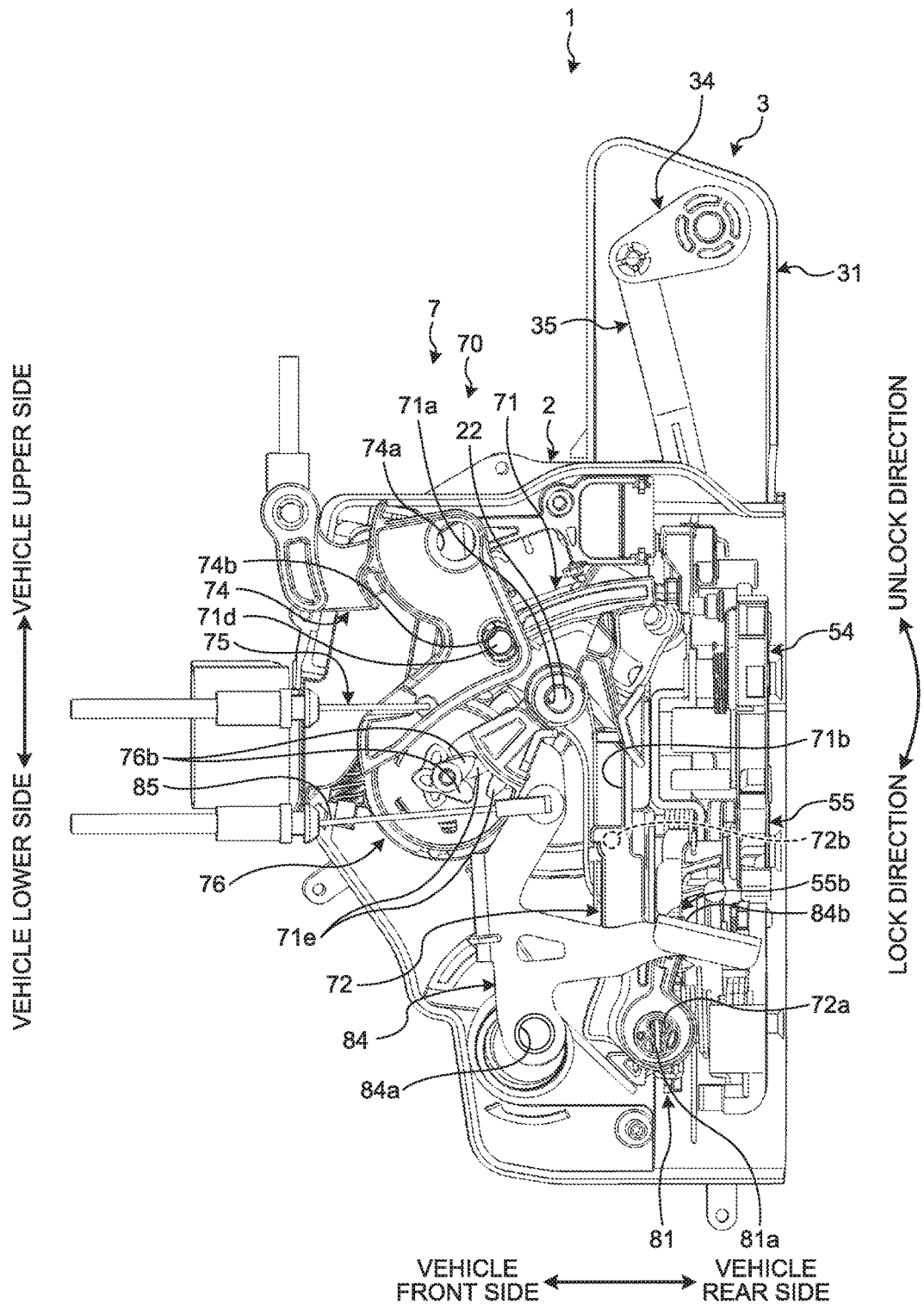
FIG. 9 is a rear view illustrating the inside of the lock/unlock unit according to the embodiment.

The lock/unlock mechanism 70 is described with reference to FIGS. 8 and 9. FIG. 8 is a perspective view of an inside of the main case 2 viewed from the vehicle outer side, and FIG. 9 is a rear view illustrating the inside of the main case 2, that is, a view of the inside of the main case 2 viewed from a vehicle inner side. As illustrated in FIG. 8, the lock/unlock mechanism 70 has a lever lock 71 and an open link 72. FIGS. 8 and 9 illustrate the lever lock 71 and the open link 72 at an unlock position. The lever lock 71 has a shaft hole 71a. A support shaft 22 of the main case 2 is inserted into the shaft hole 71a as illustrated in FIG. 9. The lever lock 71 is rotatably supported by the support shaft 22. As illustrated in FIG. 9, the lever lock 71 has an engagement wall part 71b. The engagement wall part 71b is a wall part protruding toward the vehicle inner side and extends in the vehicle upper/lower direction.

The open link 72 is a plate-like member and has a coupling hole 72a and an engagement protrusion 72b. The engagement protrusion 72b protrudes toward the vehicle outer side and abuts on the engagement wall part 71b of the lever lock 71. A coupling protrusion 81a of an auxiliary lever 81 is inserted into the coupling hole 72a. The auxiliary lever 81 is coupled to a cable 83 via an outside lever 82 illustrated in FIGS. 1 to 4. The cable 83 is coupled to an outer handle of the door. When a door opening operation on the outer handle is performed, this door opening operation is transmitted to the outside lever 82 via the cable 83 and turns the outside lever 82 and the auxiliary lever 81. The coupling protrusion 81a of the auxiliary lever 81 moves toward a vehicle upper side according to the door opening operation to move the open link 72 to the vehicle upper side.

As illustrated in FIG. 8, the open link 72 has an abutment part 72c. When the open link 72 is located at the unlock position, the abutment part 72c faces a release lever 55b in the vehicle upper/lower direction as illustrated in FIG. 8. The release lever 55b is a lever connected to the ratchet 55 and rotating integrally with the ratchet 55. When the open link 72 moves toward the vehicle upper side according to a door opening operation on the outer handle, the abutment part 72c abuts on the release lever 55b to rotate the release lever 55b. Accordingly, the ratchet 55 rotates in the clockwise direction in FIG. 4 and the latch mechanism 53 is switched to an unlatched state.

The open link 72 is capable of rotating on the coupling protrusion 81a within a range of a predetermined angle. A rotational position of the open link 72 can be switched by the lever lock 71 between an unlock position and a lock position. When the lever lock 71 rotates in a lock direction from the unlock position illustrated in FIG. 9, the engagement wall part 71b presses the engagement protrusion 72b to rotate the open link 72 in a counterclockwise direction in FIG. 9. This configuration switches the rotational position of the open link 72 from the unlock position to the lock position. When the open link 72 is located at the lock position, the abutment part 72c is located at a refuge position not abutting on the release lever 55b. Accordingly, even when the open link 72 moves toward the vehicle upper side, the abutment part 72c does not abut on the release lever 55b and a door opening operation is not transmitted to the latch mechanism 53.

Figure 10:
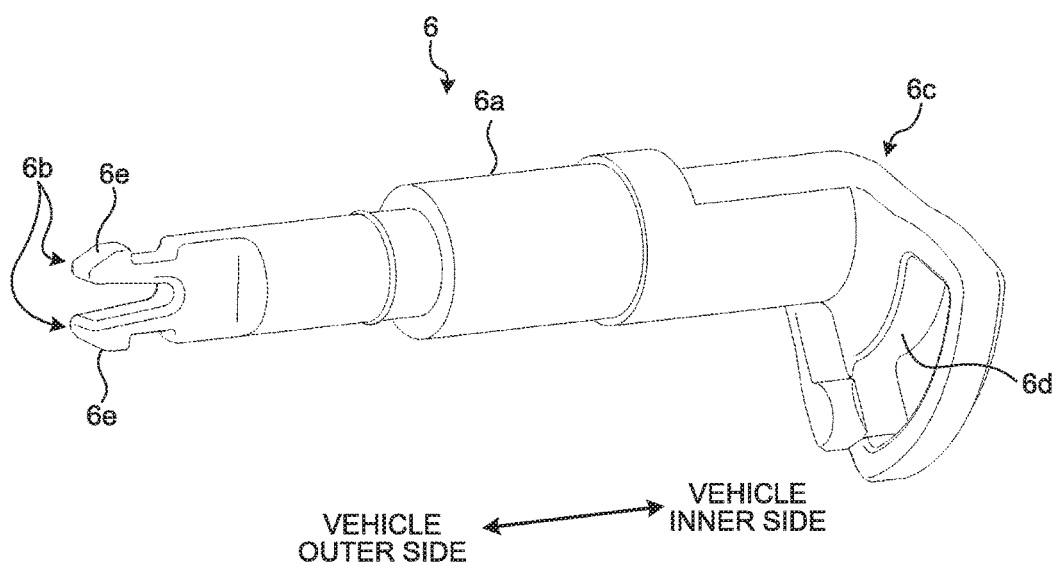
FIG. 10 is a perspective view of an input member according to the embodiment.

The rotational position of the lever lock 71 is switched between the unlock position and the lock position by a lock/unlock operation of a user with a lock knob or a key, and power of a motor 73, as described below. As illustrated in FIGS. 8 and 10, the input member 6 has the external coupling part 6b and an internal coupling part 6c. The external coupling part 6b is provided at an end part of the rotation shaft 6a on the vehicle outer side. The external coupling part 6b is a protruding part that protrudes toward the vehicle outer side and has engagement protrusions 6e. The external coupling part 6b is inserted into the engagement holes 38d of the second coupling member 38 to be engaged with the engagement holes 38d. The engagement protrusions 6e of the external coupling part 6b are engaged with engagement concave parts formed in the engagement holes 38d.

The internal coupling part 6c is connected to an end part of the rotation shaft 6a on the opposite side to the external coupling part 6b. The internal coupling part 6c is a plate-like part having a width increasing as approaching an outer side in the radial direction of the rotation shaft 6a. The internal coupling part 6c has a coupling hole 6d. The coupling hole 6d is a through hole passing through the internal coupling part 6c in a plate thickness direction. A coupling protrusion 71c of the lever lock 71 is inserted into the coupling hole 6d. The coupling protrusion 71c is provided on a face of the lever lock 71 on the vehicle outer side and protrudes toward the vehicle outer side. When the turned member 34 is rotated with the rotor of the key cylinder according to a key operation of a user, this rotational action is transmitted to the external coupling part 6b of the input member 6 via the first coupling member 35 and the second coupling member 38 to rotate the input member 6. With rotation of the input member 6, the lever lock 71 rotates from the lock position to the unlock position or from the unlock position to the lock position.

The position of the lever lock 71 is switched by an operation of a user on a lock knob provided on the door. As illustrated in FIG. 9, the lever lock 71 is coupled to the lock knob provided on a vehicle inner side of the door via a knob lever 74 and a cable 75. The knob lever 74 is a plate-like member and has a shaft hole 74a. The knob lever 74 is supported by the cover 4 to be capable of rotating on the shaft hole 74a. The cable 75 connects the knob lever 74 and the lock knob to each other. The knob lever 74 has a coupling hole 74b. The coupling hole 74b is a through hole passing through the knob lever 74 in a plate thickness direction. The lever lock 71 has a coupling protrusion 71d protruding toward the vehicle inner side. The coupling protrusion 71d is inserted into the coupling hole 74b of the knob lever 74. When a lock operation on the lock knob is performed, the cable 75 rotates the lever lock 71 via the knob lever 74 to switch the rotational position of the lever lock 71 to the lock position. When an unlock operation on the lock knob is performed, the cable 75 rotates the lever lock 71 from the lock position to the unlock position.

The motor 73 illustrated in FIG. 8 is connected to the lever lock 71 via a worm wheel 76. The worm wheel 76 is rotatably supported by a shaft 76a. The shaft 76a is supported by the main case 2 and the cover 4. A helical thread groove is formed on an external circumferential surface of the worm wheel 76 and the thread groove mates with a worm 73a of the motor 73. As illustrated in FIG. 9, the worm wheel 76 has mating teeth 76b. These mating teeth 76b mate with mating teeth 71e of the lever lock 71. Rotation of the motor 73 is transmitted to the lever lock 71 via the worm wheel 76 to rotate the lever lock 71 in an unlock direction and a lock direction.

An inside lever 84 has a shaft hole 84a. The inside lever 84 is supported by the cover 4 to be capable of rotating on the shaft hole 84a. A cable 85 is connected to the inside lever 84. The cable 85 is connected to an inner handle provided on the door. When a door opening operation on the inner handle is performed, the cable 85 turns the inside lever 84. Accordingly, an abutment part 84b of the inside lever 84 abuts on the release lever 55b to rotate the release lever 55b and switch the latch mechanism 53 to an unlatched state.

Figure 11:
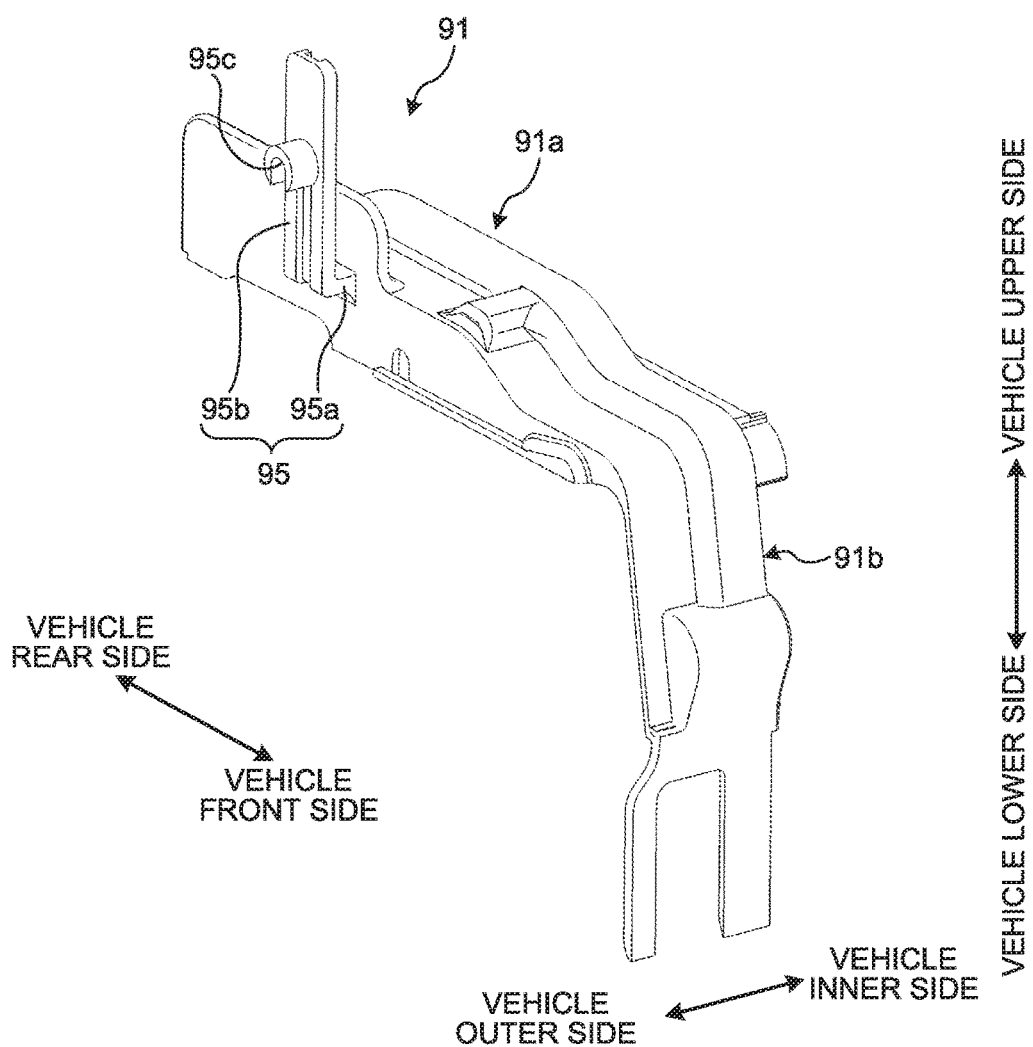
FIG. 11 is a perspective view of a first water immersion prevention body according to the embodiment.

As illustrated, for example, in FIG. 1, the vehicle door lock device 1 according to the present embodiment has a water immersion prevention body 9 that prevents water immersion into the main case 2. The water immersion prevention body 9 is made of, for example, a resin. The water immersion prevention body 9 of the embodiment has a first water immersion prevention body 91 and a second water immersion prevention body 92. The first water immersion prevention body 91 is a waterproof cover that integrally covers the main case 2 and the cover 4 from the vehicle upper side. As illustrated in FIG. 11, the first water immersion prevention body 91 has an upper cover part 91a and a front cover part 91b. The upper cover part 91a and the front cover part 91b are formed integrally and continuously. The upper cover part 91a covers matching surfaces of the main case 2 and the cover 4, an upper part of the main case 2, and an upper part of the cover 4 integrally. The front cover part 91b integrally covers the matching surfaces of the main case 2 and the cover 4, a front part of the main case 2, and a front part of the cover 4. The first water immersion prevention body 91 can prevent water immersion into the main case 2 from the matching surfaces of the main case 2 and the cover 4, and the like.

Figure 12:
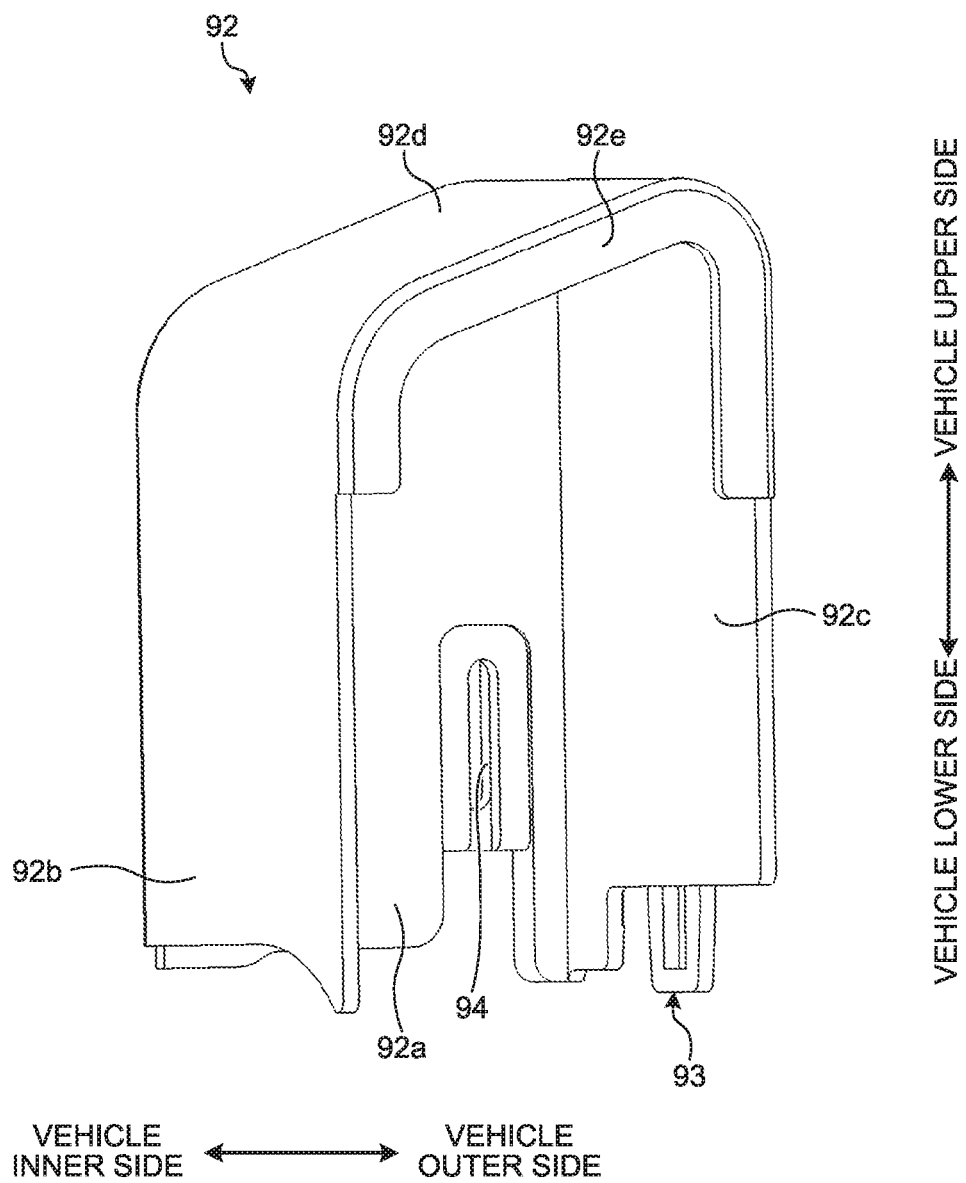
FIG. 12 is a perspective view of a second water immersion prevention body according to the embodiment.

The second water immersion prevention body 92 closes the sub case 31 and forms a housing unit that houses the first coupling member 35 along with the sub case 31. As illustrated in FIG. 12, the second water immersion prevention body 92 has an inner wall part 92a, side wall parts 92b and 92c, an upper wall part 92d, an outer wall part 92e, an engagement part 93, and an adjustment hole (an adjustment unit) 94. The side wall parts 92b and 92c are wall parts facing each other in the vehicle front/rear direction and are formed integrally with respective both end parts of the inner wall part 92a. The upper wall part 92d is a wall part in the vehicle upper direction and is molded together with an upper end part of the inner wall part 92a and the side wall parts 92b and 92c. The inner wall part 92a closes an opening of the sub case 31 on the vehicle inner side. The side wall parts 92b and 92c laterally cover the side wall parts 31c and 31d of the sub case 31, respectively. The upper wall part 92d covers the upper wall part 31e of the sub case 31 from the vehicle upper side. The outer wall part 92e covers a vehicle upper side of the outer wall part 31b of the sub case 31 from the vehicle outer side. The second water immersion prevention body 92 covers the opening of the sub case 31 and prevents water immersion into the sub case 31. Accordingly, the second water immersion prevention body 92 can prevent water immersion into the main case 2 via the first coupling member 35. The engagement part 93 engages with a protrusion 31f provided on the side wall part 31d of the sub case 31 to fix the second water immersion prevention body 92 to the sub case 31 as illustrated in FIG. 2.

The sub case 31 and the second water immersion prevention body 92 of the present embodiment have an adjustment unit that can adjust a relative position in the vehicle upper/lower direction with respect to the main case 2 according to the length of the first coupling member 35. This enables the sub case 31 and the second water immersion prevention body 92 of the present embodiment to handle various key cylinders at different heights.

As illustrated in FIG. 1, the sub case 31 has a first adjustment unit 36 and a second adjustment unit 37. The first adjustment unit 36 has a first fixing part 36a and the adjustment hole 36b. The first fixing part 36a is a plate-like part formed integrally with the outer wall part 31b. The first fixing part 36a protrudes from a lower end of the outer wall part 31b toward a vehicle lower side. The adjustment hole 36b is provided on the first fixing part 36a and passes through the first fixing part 36a in a plate thickness direction. The adjustment hole 36b is a longhole formed to have a predetermined length in the vehicle upper/lower direction. The first fixing part 36a is fixed to the main case 2 with the thermal caulking part 33. The adjustment hole 36b enables adjustment of the relative position of the sub case 31 in the vehicle upper/lower direction with respect to the main case 2 when the first fixing part 36a is fixed by thermal caulking.

The second adjustment unit 37 has a second fixing part 37a and an adjustment hole 37b. The second fixing part 37a is a plate-like part formed integrally with the side wall part 31d on the vehicle front side. The second fixing part 37a protrudes from the side wall part 31d toward the vehicle front side. The adjustment hole 37b is provided on the second fixing part 37a and passes through the second fixing part 37a in the plate thickness direction. The adjustment hole 37b is a longhole formed to have a predetermined length in the vehicle upper/lower direction. The second fixing part 37a is fixed to the main case 2 with the screw 32. The adjustment hole 37b enables adjustment of the relative position of the sub case 31 in the vehicle upper/lower direction with respect to the main case 2 when the second fixing part 37a is fixed with the screw 32. Adjustment widths of the relative position in the vehicle upper/lower direction by the adjustment holes 36b and 37b are equal. The relative position in the vehicle upper/lower direction of the sub case 31 of the present embodiment with respect to the main case 2 can be adjusted within a range allowed by the adjustment holes 36b and 37b.

Figure 13:
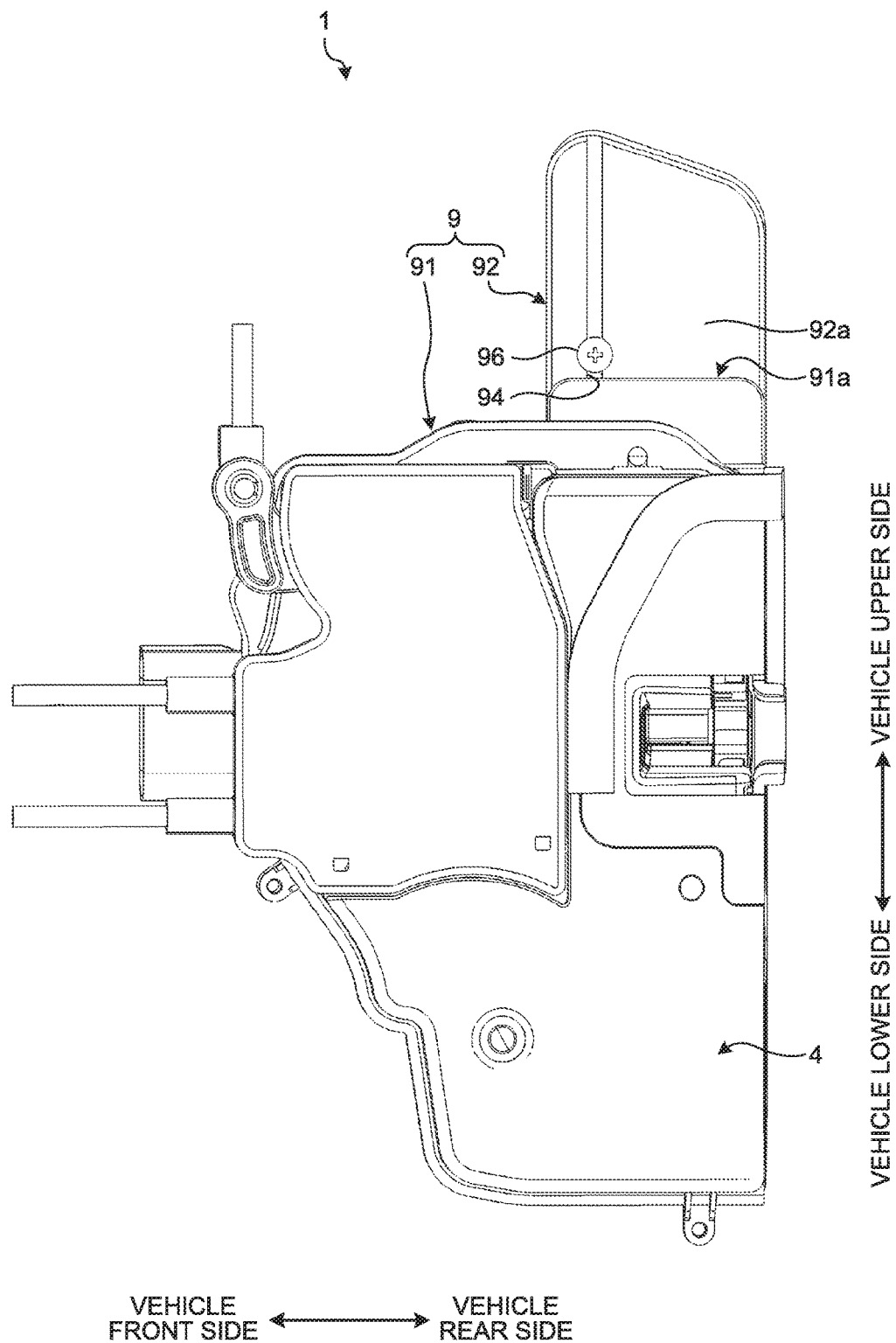
FIG. 13 is a rear view of the vehicle door lock device according to the embodiment.

As illustrated in FIG. 12, the adjustment unit of the second water immersion prevention body 92 is a slit-like adjustment hole 94 formed on the inner wall part 92a. The adjustment hole 94 passes through the inner wall part 92a in the plate thickness direction. The adjustment hole 94 is a longhole formed to have a predetermined length in the vehicle upper/lower direction. The second water immersion prevention body 92 is fixed to a support unit 95 illustrated in FIG. 11. The support unit 95 is connected to the first water immersion prevention body 91. More specifically, the support unit 95 has a base part 95a protruding from the upper cover part 91a toward the vehicle outer side, and a plate-like part 95b protruding from the base part 95a toward the vehicle upper side. A hole part 95c circular in cross-section is provided on the plate-like part 95b. A thread groove is formed on an inner surface of the hole part 95c. The inner wall part 92a of the second immersion prevention body 92 is inserted between the plate-like part 95b and the upper cover part 91a and is fixed to the plate-like part 95b with a screw 96 as illustrated in FIG. 13. The screw 96 is inserted into the adjustment hole 94 of the second water immersion prevention body 92 and then screwed into the hole part 95c. The adjustment hole 94 enables positional adjustment of the second water immersion prevention body 92 with respect to the main case 2.

Figure 14:
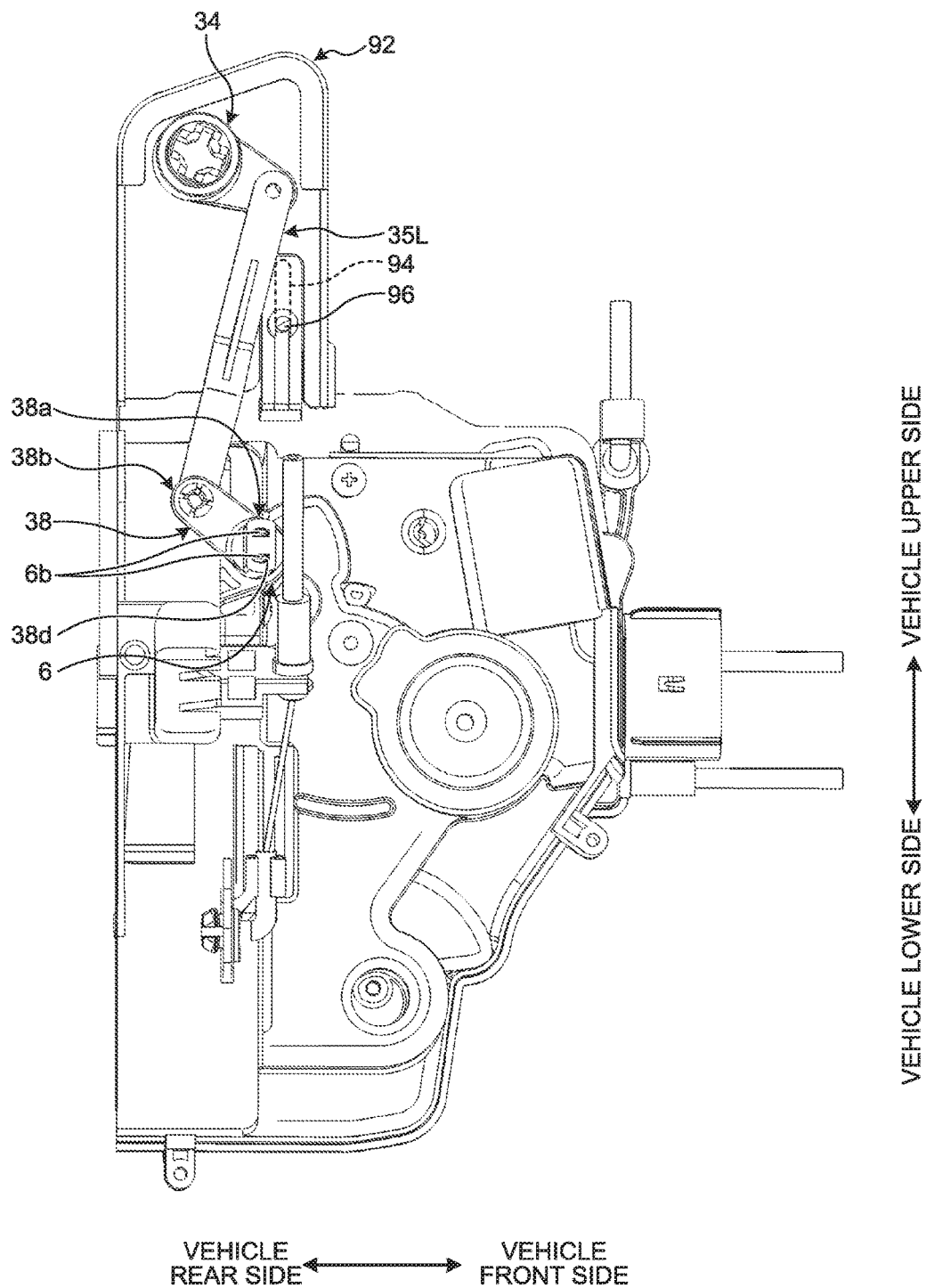
FIG. 14 is a front view explaining a positional adjustment of the second water immersion prevention body.
Figure 15:
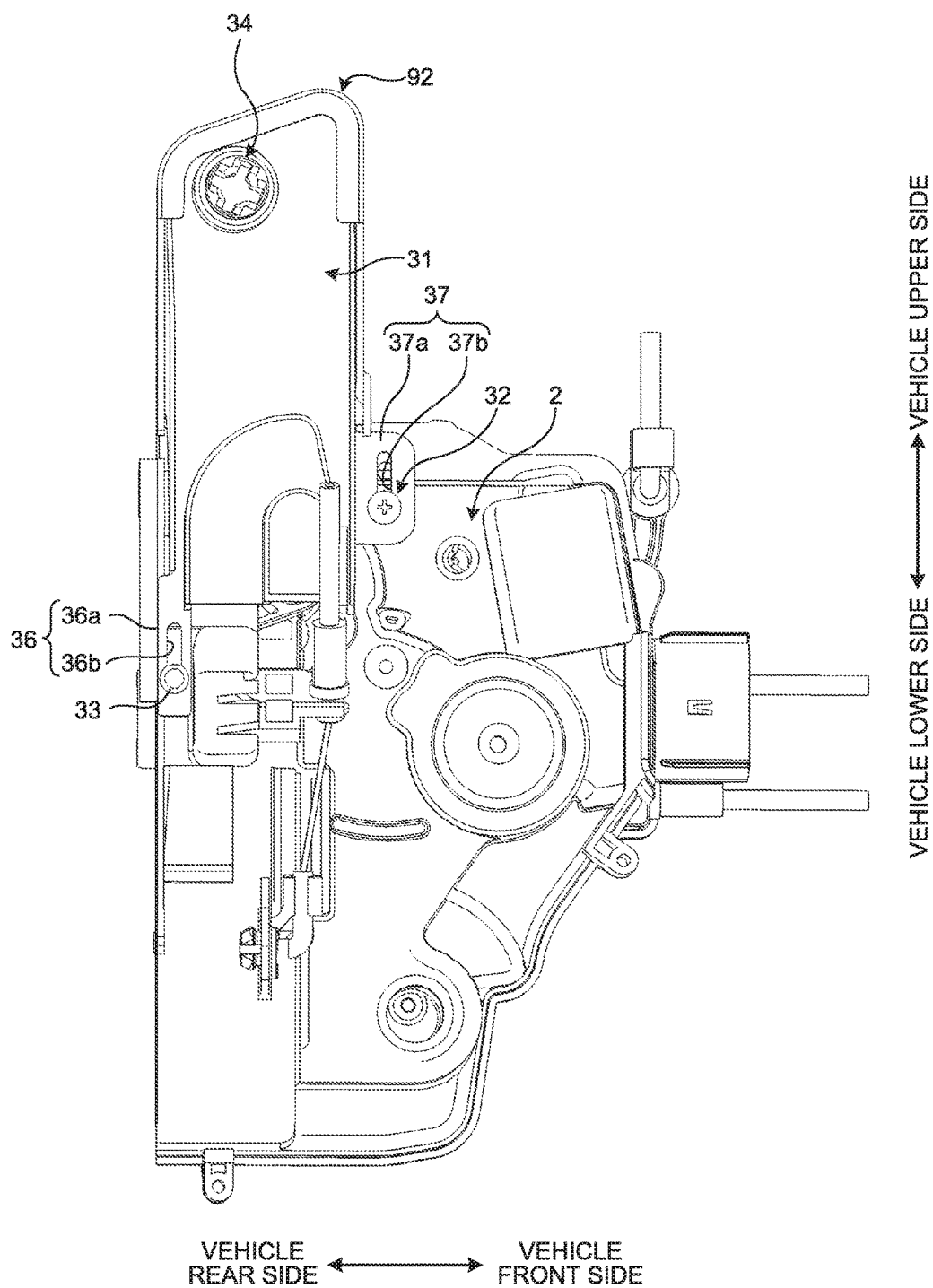
FIG. 15 is a front view explaining a positional adjustment of the sub case.

The vehicle door lock device 1 according to the present embodiment can handle key cylinders placed at various height positions. The position of a key cylinder is determined according to easiness of the operation or the vehicle design. Meanwhile, the position of the latch mechanism 53 is determined to be capable of effectively holding the door. Therefore, the relative position between the key cylinder and the latch mechanism 53 varies with each of vehicle types according to forms of the vehicle body or the door. In the vehicle door lock device 1 of the present embodiment, the first coupling member 35 is used that has the length differing according to the relative position between the lock/unlock mechanism 70 and the key cylinder. For example, as illustrated in FIG. 14, a first coupling member 35L longer than the first coupling member 35 illustrated in FIG. 5 may be used. When the first coupling member 35L is used, the relative position of the sub case 31 in the vehicle upper/lower direction with respect to the main case 2 is adjusted by the first adjustment unit 36 and the second adjustment unit 37 as illustrated in FIG. 15. The position of the sub case 31 in FIG. 15 is a position on a vehicle uppermost side within the adjustable range. The relative position of the second water immersion prevention body 92 with respect to the main case 2 is adjusted according to the length of the first coupling member 35 or 35L. As illustrated in FIG. 14, the relative position of the second water immersion prevention body 92 in the vehicle upper/lower direction with respect to the main case 2 is adjusted with the adjustment hole 94 serving as the adjustment unit. The position of the second water immersion prevention body 92 in FIG. 14 is a position on a vehicle uppermost side within the adjustable range.

Figure 16:
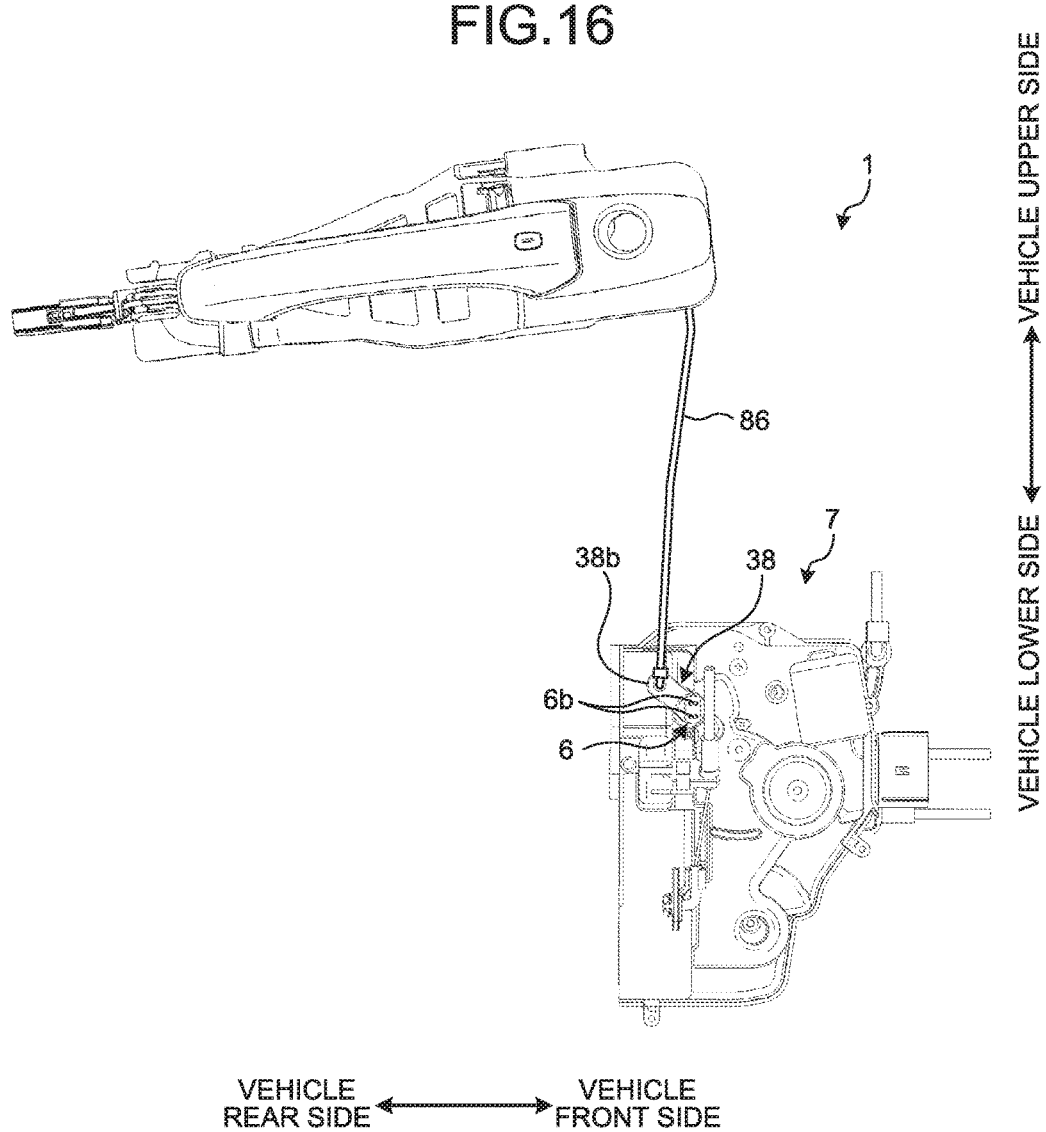
FIG. 16 is a front view illustrating a coupling with a rod.
Figure 17:
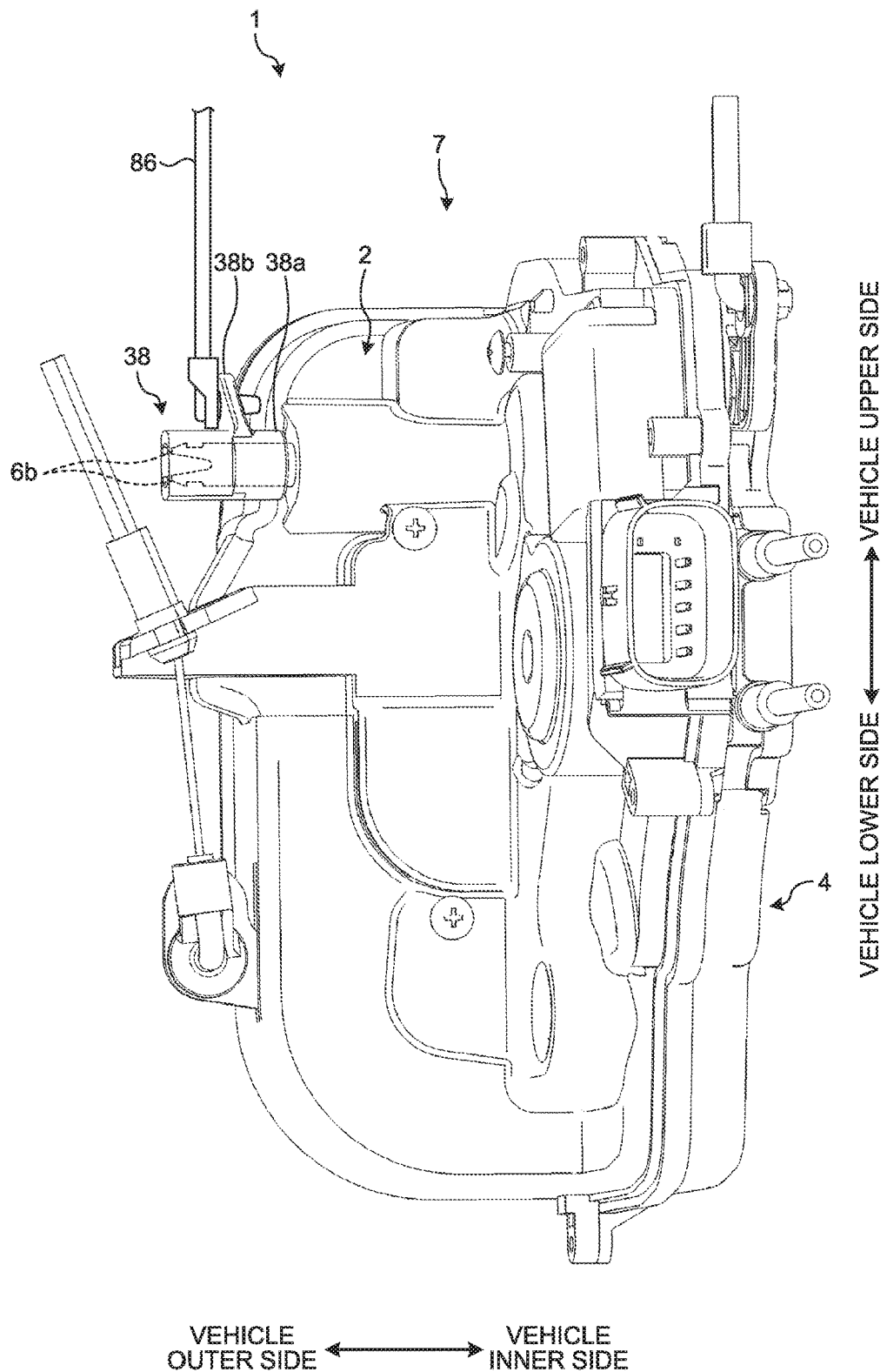
FIG. 17 is a side view illustrating a coupling with a rod.

In the vehicle door lock device 1 according to the present embodiment, a common lock/unlock unit 7 can be used regardless of a unit that couples the rotor of the key cylinder to the lock/unlock unit 7. The rotor of the key cylinder and the input member 6 of the lock/unlock unit 7 can be coupled with a rod 86 as illustrated in FIG. 16, instead of the first coupling member 35 or 35L in the present embodiment. For example, as illustrated in FIG. 16, one end of the rod 86 is coupled to the external coupling part 6b of the input member 6 via the second coupling member 38. The other end of the rod 86 is coupled to the rotor of the key cylinder. In this way, the common lock/unlock unit 7 can be used regardless of a coupling member because the external coupling part 6b of the input member 6 is located on a vehicle outer side than the main case 2, for example. As illustrated in FIG. 17, the external coupling part 6b protrudes from the main case 2 toward the vehicle outer side. Therefore, when the rotor of the key cylinder and the external coupling part 6b are connected with the rod 86 extending linearly in the vehicle upper/lower direction, the rod 86 does not interfere with the main case 2. Accordingly, the lock/unlock unit 7 according to the present embodiment can be coupled to the rotor of a key cylinder with various members according to the vehicle grades or preferences. Preferably, the external coupling part 6b be placed at a position on the vehicle upper side in the main case 2 so as to prevent the coupling member from interfering with the main case 2.

As described above, the vehicle door lock device 1 according to the present embodiment has the lock/unlock unit 7 having the main case 2, the input member 6, the lock/unlock mechanism 70, and the cover 4, and the transmission unit 3. The external coupling part 6b of the input member 6 protrudes from the main case 2 in the vehicle outside direction in a state where the main case 2 is attached to a door. Therefore, the lock/unlock unit 7 can be commonly used with plural types of coupling members. In the vehicle door lock device 1 according to the present embodiment, only by adding the transmission unit 3 to the common lock/unlock unit 7, it becomes possible for coupling members of various forms to be applied to the common lock/unlock unit 7. Therefore, the number of dedicated components can be reduced and a reduction in the cost can be achieved.

Further, the vehicle door lock device 1 according to the present embodiment includes the water immersion prevention body 9 that integrally covers the main case 2 and the cover 4 from the vehicle upper side and prevents water immersion into the main case 2. The water immersion prevention body 9 can prevent water immersion into the main case 2 from the matching surfaces of the main case 2 and the cover 4, and the like.

The transmission unit 3 according to the present embodiment has the sub case 31 housing therein the first coupling member 35 or 35L and the second coupling member 38. The water immersion prevention body 9 covers the sub case 31 and prevents water immersion into the sub case 31. The vehicle door lock device 1 according to the present embodiment thus can prevent water immersion into the main case 2 via the input member 6.

The sub case 31 according to the present embodiment has the first adjustment unit 36 and the second adjustment unit 37 that can adjust the relative position in the vehicle upper/lower direction with respect to the main case 2. Therefore, in the transmission unit 3 according to the present embodiment, the positional adjustment on the sub case 31 according to the height position of a key cylinder can be performed. As a result, a common sub case 31 can be attached to doors which differs based on the vehicle types or specifications and thus an increase of the component types may be prevented. Furthermore, the common sub case 31 may be used when the first coupling member 35 is used having a various length determined based on the height position of a key cylinder.

The water immersion prevention body 9 of the present embodiment has the first water immersion prevention body 91 that integrally covers the main case 2 and the cover 4 from the vehicle upper side, and the second water immersion prevention body 92 that covers the sub case 31. The sub case 31 and the second water immersion prevention body 92 have the adjustment unit that can adjust the relative position in the vehicle upper/lower direction with respect to the main case 2. The sub case 31 has the first adjustment unit 36 and the second adjustment unit 37, and the second water immersion prevention body 92 has the adjustment hole 94. Therefore, a common sub case 31 and a common second water immersion prevention body 92 can be applied to various doors which differ based on the vehicle type or specification.

The sub case 31 of the present embodiment is fixed to the main case 2 with an undetachable fixing unit. As an example of the undetachable fixing unit, a fixing by thermal caulking is performed in the present embodiment. However, the fixing unit is not limited to thermal caulking. The "undetachable fixing unit" refers to a fixing unit that does not allow the sub case 31 to be detached from the main case 2 without a fixing member or a fixing part being irreversibly deformed or destroyed.

Modification of Embodiment

Figure 18:
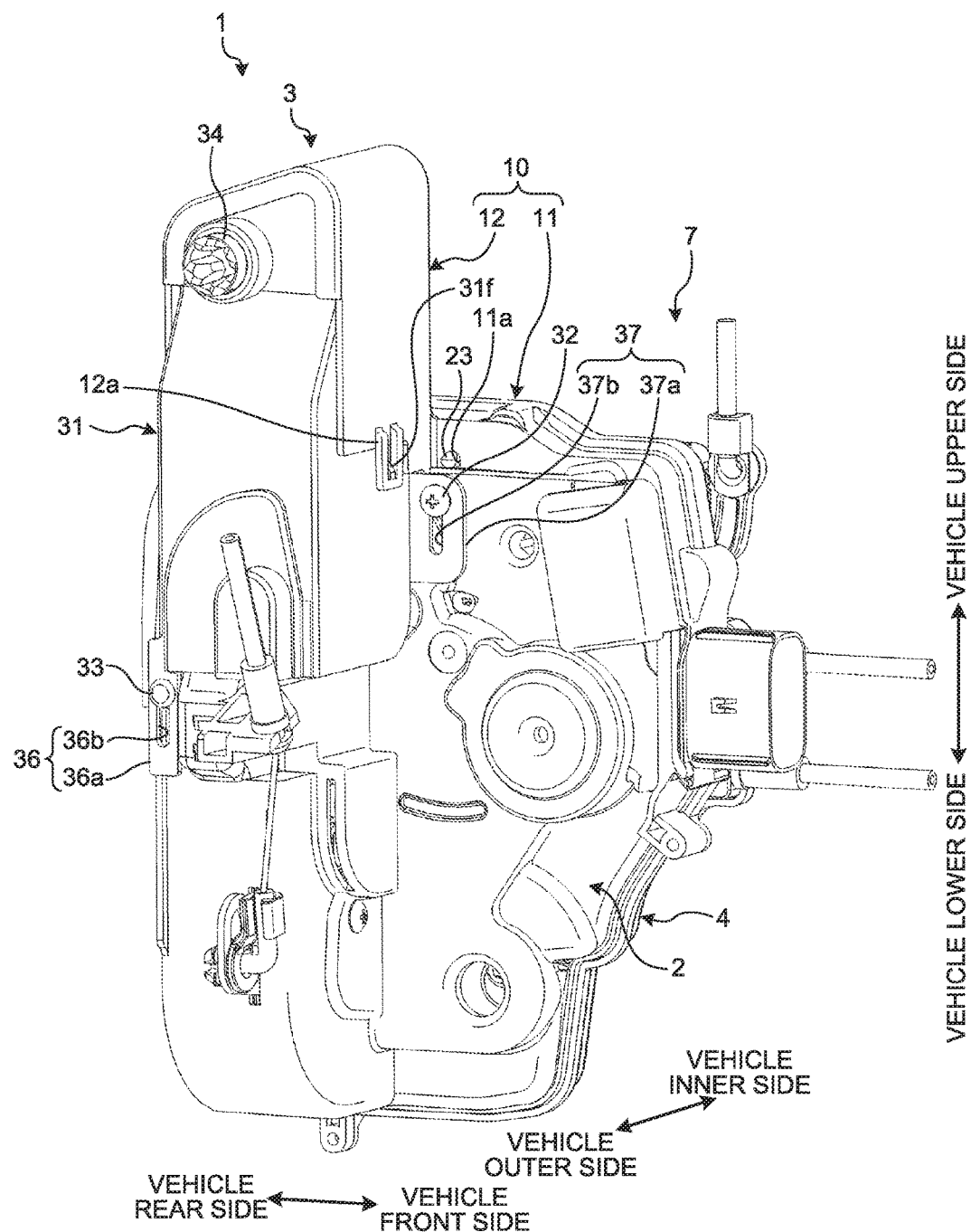
FIG. 18 is a perspective view of a vehicle door lock device according to a modified embodiment.

The vehicle door lock device 1 according to a modified embodiment is described with reference to FIGS. 18 and 19. FIG. 18 is a perspective view of a vehicle door lock device according to the modified embodiment and FIG. 19 is a front view of the vehicle door lock device according to the modified embodiment. A different point of the vehicle door lock device 1 according to the modified embodiment from the vehicle door lock device 1 according to the embodiment described above is that a part covering the main case 2 and the cover 4 and a part covering the sub case 31 in a water immersion prevention body 10 are integrally formed as one body.

As illustrated in FIG. 18, the water immersion prevention body 10 of the modification has a first constituent part 11 and a second constituent part 12. The first constituent part 11 integrally covers the main case 2 and the cover 4 from the vehicle upper side similarly to the first water immersion prevention body 91 in the embodiment described above. The second constituent part 12 covers the sub case 31 similarly to the second water immersion prevention body 92 in the embodiment described above. The first constituent part 11 and the second constituent part 12 are formed integrally.

As illustrated in FIG. 19, an engagement hole 11a is provided on a wall part of the first constituent part 11 on the vehicle outer side. An engagement part 12a similar to the engagement part 93 in the embodiment described above is provided on a wall part of the second constituent part 12 on the vehicle front side. As illustrated in FIG. 18, a protrusion 23 of the main case 2 is engaged with the engagement hole 11a. Engagement between the engagement hole 11a and the protrusion 23 fixes the water immersion prevention body 10 to the main case 2. The protrusion 31f of the sub case 31 is engaged with the engagement part 12a. Engagement between the engagement part 12a and the protrusion 31f fixes the water immersion prevention body 10 to the sub case 31.

The sub case 31 has the first adjustment unit 36 and the second adjustment unit 37 similar to those in the embodiment described above. Therefore, the relative position of the sub case 31 in the vehicle upper/lower direction with respect to the main case 2 can be adjusted. Meanwhile, the water immersion prevention body 10 of the modification does not have a function to adjust the relative position to the main case 2. Accordingly, in the vehicle door lock device 1 of the modification, the immersion prevention bodies 10 of different shapes are preferably adopted according to the relative position of the sub case 31 with respect to the main case 2.

The contents disclosed in the embodiment and those disclosed in the modified embodiment described above may be appropriately combined with each other to carry out.

REFERENCE SIGNS LIST 1 vehicle door lock device
2 main case
3 transmission unit
4 cover
5 latch device
6 input member
6a rotation shaft
6b external coupling part
6c internal coupling part
6d coupling hole
6e engagement protrusion
7 lock/unlock unit
9, 10 water immersion prevention body
11 first constituent part
11a engagement hole
12 second constituent part
21 support part
21a through hole
22 support shaft
31 sub case
31a support part
31b outer wall part
31c, 31d side wall part
31e upper wall part
31f protrusion
32 screw
33 thermal caulking part
34 turned member
35, 35L first coupling member
36 first adjustment unit
36b adjustment hole
37 second adjustment unit
38 second coupling member
38a main body
38b coupling part
38c coupling hole
38d engagement hole
51 body
52 cover plate
53 latch mechanism
54 latch
54a shaft
54b abutment part
54c engagement groove
54d first protruding part
54e second protruding part
55 ratchet
55a shaft
55b release lever
70 lock/unlock mechanism
71 lever lock
71a shaft hole
71b engagement wall part
71c coupling protrusion
71d coupling protrusion
71e mating teeth
72 open link
72a coupling hole
72b engagement protrusion
72c abutment part
73 motor 74 knob lever
74a shaft hole
74b coupling hole
75 cable
76 worm wheel
76a shaft
76b mating teeth
81 auxiliary lever
82 outside lever
83 cable
84 inside lever
85 cable
86 rod
91 first water immersion prevention body
91a upper cover part
91b front cover part
92 second water immersion prevention body
92a inner wall part
92b, 92c side wall part
92d upper wall part
92e outer wall part
93 engagement part
94 adjustment hole (adjustment unit)
95 support unit
96 screw

The invention claimed is:

1. A vehicle door lock device comprising:
a lock/unlock unit including a lock/unlock mechanism that switches whether to transmit a door opening operation on a door to a latch mechanism; and
a transmission unit that transmits a lock/unlock operation with a key to the lock/unlock unit, wherein
the lock/unlock unit includes
a main case that houses therein the lock/unlock mechanism and supports the latch mechanism;
an input member having a rotation shaft passing through the main case, being coupled to the lock/unlock mechanism in the main case, and having an external coupling part outside the main case; and
a cover that closes an opening of the main case,
the transmission unit includes
a coupling member that couples a turned member to the external coupling part, the turned member rotating integrally with a rotor of a key cylinder, and
a sub case that houses therein the coupling member, and
the external coupling part protrudes from the main case in a vehicle outside direction in a state where the main case is attached to the door, and
the sub case has an adjustment unit that is capable of adjusting a relative position in a vehicle upper/lower direction with respect to the main case.

2. The vehicle door lock device according to claim 1, further comprising a water immersion prevention body that integrally covers the main case and the cover from a vehicle upper side, and prevents water immersion into the main case.

3. The vehicle door lock device according to claim 2, wherein
the water immersion prevention body further covers the sub case and prevents water immersion into the sub case.

4. The vehicle door lock device according to claim 2, wherein
the water immersion prevention body has a first water immersion prevention body that integrally covers the main case and the cover from a vehicle upper side, and a second water immersion prevention body that covers the sub case, and
the sub case and the second water immersion prevention body have an adjustment unit that is capable of adjusting a relative position in a vehicle upper/lower direction with respect to the main case.

5. The vehicle door lock device according to claim 1, wherein
the sub case is fixed to the main case with an undetachable fixing unit.

* * * * *